(12) United States Patent
Hulse et al.

(10) Patent No.: US 12,452,938 B2
(45) Date of Patent: Oct. 21, 2025

(54) DUAL-NETWORK CASTING SYSTEM

(71) Applicant: NOMADIX, INC., Woodland Hills, CA (US)

(72) Inventors: David A. Hulse, Athens (GR); Joshua E. York, White Bluff, TN (US); Stuart J. Clark, Glasgow (GB)

(73) Assignee: Nomadix, Inc., Plano, TX (US)

( * ) Notice: Subject to any disclaimer, the term of this patent is extended or adjusted under 35 U.S.C. 154(b) by 286 days.

(21) Appl. No.: 18/193,551

(22) Filed: Mar. 30, 2023

(65) Prior Publication Data

US 2023/0319917 A1    Oct. 5, 2023

Related U.S. Application Data

(60) Provisional application No. 63/362,955, filed on Apr. 13, 2022, provisional application No. 63/362,323, filed on Mar. 31, 2022.

(51) Int. Cl.
| | |
|---|---|
| *H04W 72/00* | (2023.01) |
| *H04W 12/08* | (2021.01) |
| *H04W 72/30* | (2023.01) |
| *H04W 76/14* | (2018.01) |
| *H04W 76/18* | (2018.01) |

(52) U.S. Cl.
CPC ........... *H04W 76/14* (2018.02); *H04W 12/08* (2013.01); *H04W 72/30* (2023.01); *H04W 76/18* (2018.02)

(58) Field of Classification Search
None
See application file for complete search history.

(56) References Cited

U.S. PATENT DOCUMENTS

| | | |
|---|---|---|
| 11,184,364 B2 | 11/2021 | Murthy |
| 2016/0014166 A1 | 1/2016 | Warrick |
| 2019/0182060 A1 | 6/2019 | Simotas |
| 2019/0215327 A1 | 7/2019 | Murthy |

OTHER PUBLICATIONS

International Preliminary Report on Patentability and Written Opinion mailed Oct. 10, 2024, for PCT Application No. PCT/US2023/016990, filed Mar. 30, 2023, ten pages.

*Primary Examiner* — Abdelillah Elmejjarmi
(74) *Attorney, Agent, or Firm* — Morrison & Foerster LLP

(57) ABSTRACT

Generally described, one or more aspects of the present application relate to providing a casting server that can pair specific user devices to appropriate corresponding casting devices and control the network communication between the user devices and the casting devices, such that only the casting devices or display devices that a given user is authorized to access are made visible to the user via the user's device. By doing so, the user is prevented from accessing or casting the user's content to other casting devices and display devices to which the user may not have access such as those in other users' rooms.

20 Claims, 12 Drawing Sheets

DUAL-NETWORK CASTING SYSTEM

CROSS-REFERENCE TO OTHER APPLICATIONS

This application is a U.S. non-provisional application of U.S. Provisional Application No. 63/362,323, filed Mar. 31, 2022 and titled "DUAL-NETWORK CASTING SYSTEM," and U.S. Provisional Application No. 63/362,955, filed Apr. 13, 2022 and titled "DUAL-NETWORK CASTING SYSTEM," the disclosures of which are hereby incorporated by reference in their entirety for all purposes and made part of this application.

BACKGROUND

Casting devices allow users to stream content from their mobile devices or computers onto a larger screen, such as a television. With these devices, users can easily watch their favorite TV shows, movies, or other content on a larger display without having to connect their device physically to the TV. Thus, casting devices provide a convenient and flexible way to enjoy entertainment on a bigger screen.

BRIEF DESCRIPTION OF THE DRAWINGS

The embodiments described herein are illustrated by way of example, and not by way of limitation, in the figures of the accompanying drawings in which like references indicate similar elements.

DETAILED DESCRIPTION

Introduction

Typically, casting devices such as Google Chromecast® and Apple TV® are designed to be on a user's home Wi-Fi network, and all the user devices that are expected to use it are expected to be on the same Wi-Fi network. In such a home scenario, the users (also used herein to refer to their user computing devices such as smartphones, laptops, tablets, etc.) of a casting device would be expected to be on this same Wi-Fi network as the casting device itself.

However, in a hospitality setting such as at a hotel, connecting all the guests to the same Wi-Fi network as the casting devices usable by the guests would mean that every guest device could see every casting device that is connected to the Wi-Fi network and could potentially hijack another guest's TV in another hotel room.

These and other issues can be addressed according to embodiments of the present disclosure in which the casting devices and the user computing devices (also referred to herein as guest devices) accessing the casting devices are connected to separate wireless networks, and network communications between the user computing devices and the casting devices are facilitated by a casting server connected to both of the wireless networks. By keeping the casting devices on a separate network as the guest devices from which casting can be initiated, the discoverability issue described above can be addressed without needing to set up a separate wireless network for each room or unit or for each casting device or for each set of casting devices in such a unit, as is typically done in the home environments.

With a casting server that can pair specific user devices to appropriate corresponding casting devices and control the network communication between the user devices and the casting devices, only the casting devices or display devices that a user is authorized to access are made visible to the user via the user's device, and the user is prevented from accessing or casting the user's content to other casting devices and display devices that are in other user's rooms.

These and other aspects of the disclosure will now be described with regard to certain examples and implementations, which are intended to illustrate but not limit the disclosure. Although the examples and implementations described herein will focus, for the purpose of illustration, on specific calculations and algorithms, one of skill in the art will appreciate the examples are for illustration only, and are not intended to be limiting.

Network Access System

Figure 1:
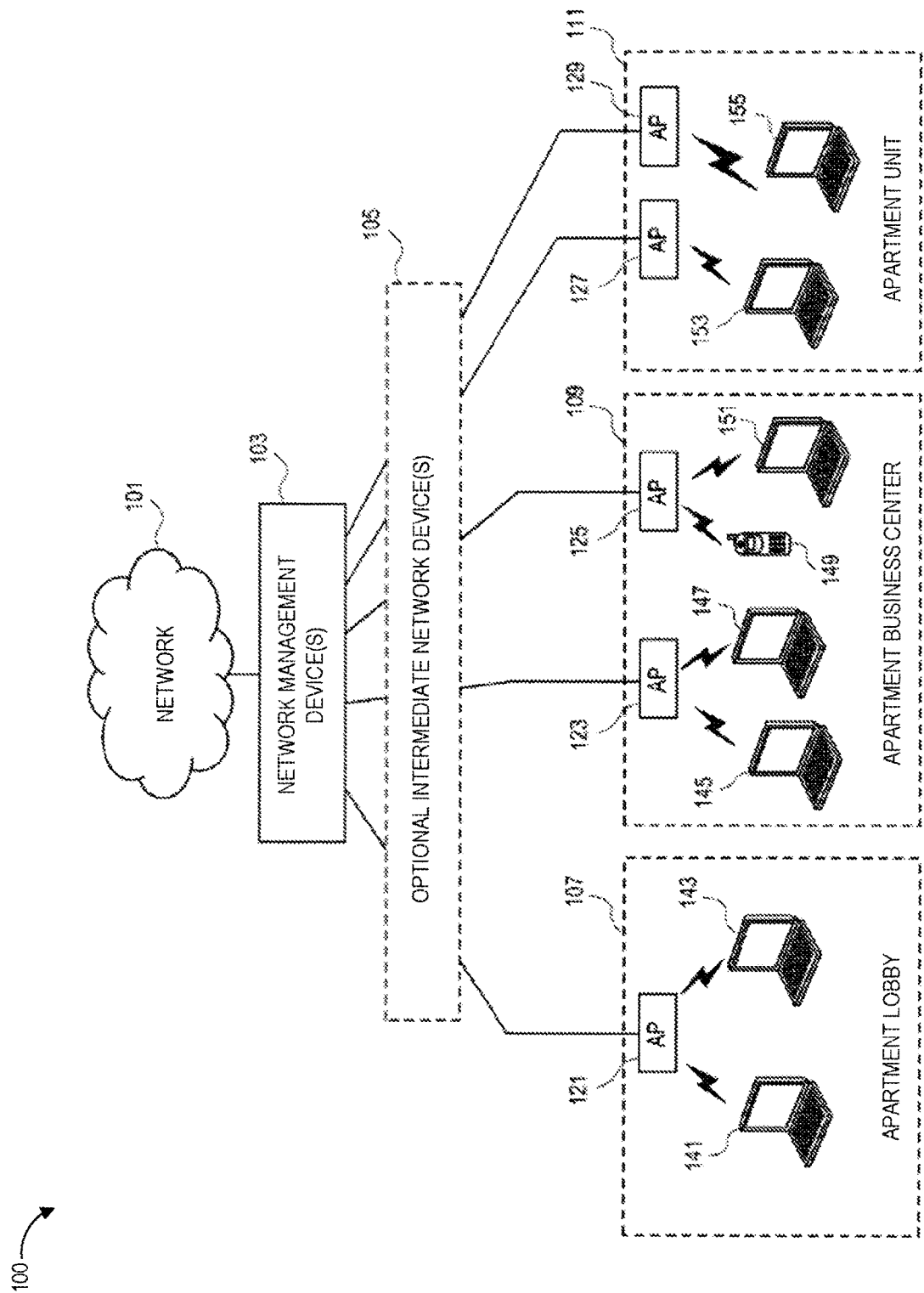
FIG. 1 illustrates an implementation of a network in accordance with aspects of this disclosure.

FIG. 1 illustrates an implementation of a network access system that may be used to implement one or more of the techniques described herein. The system includes various user devices 141, 143, 145, 147, 149, 151, 153, 155. User devices can include, such as, for example, laptops, desktop computers, smartphones, PDAs and any other wired or wireless network enabled communication devices. The user devices 141, 143, 145, 147, 149, 151, 153, 155 communicate with access points 121, 123, 125, 127, 129. Access points 121, 123, 125, 127, 129 provide wired or wireless communications with network management device(s) 103. The network management device(s) 103 control network communications in-between access points and between the access points and network 101. In some implementations, the network management device(s) 103 are operated by a single entity. In an implementation, the network management device(s) 103 create a single network. Optionally, intermediate network device(s) 105 can also be used, including, for example, routers, switches, hubs, repeaters, etc. to assist in providing communications between access points 121, 123, 125, 127 and network management device(s) 103. The network 101 can be, for example, a public network such as the Internet. Network management device(s) 103 (also referred to herein as a network management system) can include network gateways, such as, for example, network access gateways commercially available from Nomadix, Inc. of Woodland Hills, CA. As will be understood by those of skill in the art from the present disclosure, other network management devices can also be used.

Devices are generally programmed to automatically select between access points, by, for example, determining which access point provides the strongest signal. A device may be in between three different access points and is able to communicate with all of them, but may eventually choose one access point to communicate with. In some cases, an access point may not allow a device to communicate through it, in which case the user device may attempt to communicate with another access point. For example, a user device may have the strongest signal with access point A, but may only be authenticated with access point B. In this case, the user devices may communicate with access point B despite the weaker signal. As will be understood, user devices can be configured to select access points based on any number of different selection options, including, for example, signal strength, bandwidth availability, access rights, access points corresponding to a particular SSID, etc. When an access point is out of range, a user device may no longer be able to communicate with it and may attempt to find another access point. In an implementation, switching between access points is seamless, e.g. there is no loss of network session, and a user may not even realize that they have switched access points.

As illustrated in FIG. 1, the network includes multiple physical areas including apartment lobby 107, apartment business center 109, and apartment unit 111. Although not shown in FIG. 1, the network may include additional apartment lobbies, apartment business centers, and/or apartment units. Each physical area may include one or more access points. In some cases, two or more physical areas may share a single access point.

In some implementations, access points advertise their presence by broadcasting a Service Set Identifier (SSID), Extended Service Set Identifier (ESSID), and/or Basic Service Set Identifier (BSSID), or the like, collectively referred to herein as SSID. In some implementations, the same SSID is assigned to all access points in a network. In other implementations, a different SSID is assigned to each access point or a group of access points (or to each region or group of regions) in the network. In yet other implementations, multiple SSID's can be assigned to the same set of access points. In this respect virtual SSID's can be set up corresponding to different groupings of access points. The network management device(s) 103 may provide different levels of service to different users across multiple SSID's or across the same SSID based on the users' pre-shared keys (e.g., Wi-Fi passwords) and/or based on the durable and/or non-durable identifiers associated with the users' user devices, such as the MAC addresses and/or user profiles stored on the user devices (or one or more parameters included in the user profiles). Although the MAC address is used as an example identifier in describing one or more embodiments of the present disclosure (e.g., in the context of providing customized services, creating a pairing, etc.), in other embodiments, the IP address or other durable or non-durable identifier can be used instead. Similarly, although the IP address is used as an example identifier in describing one or more embodiments of the present disclosure, in other embodiments, the MAC address or other durable or non-durable identifier can be used instead.

Multi-Dwelling Units (MDUs)

Figure 2:
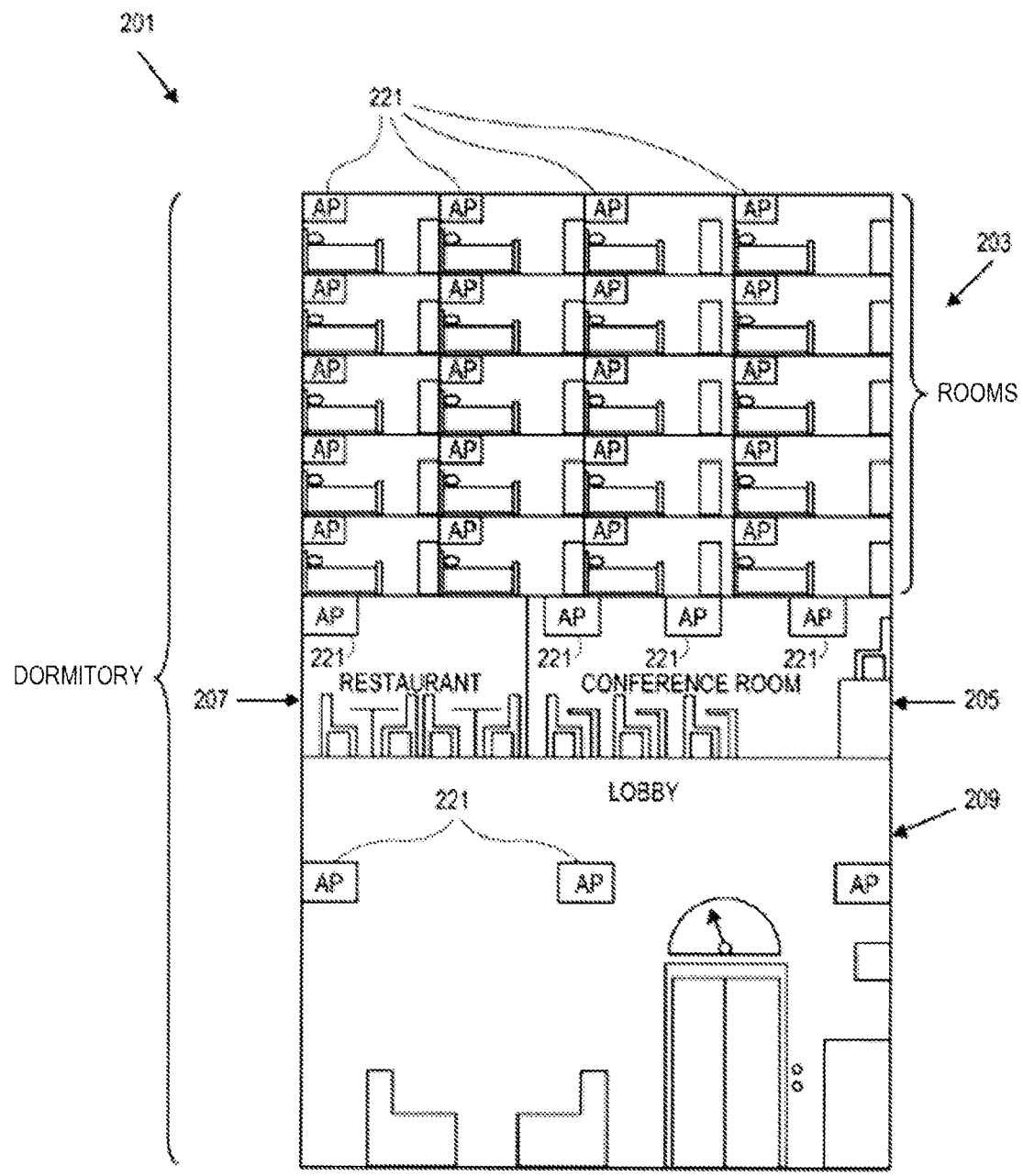
FIG. 2 illustrates a cross-section of various access points in the context of multi-dwelling units (MDUs) in accordance with aspects of this disclosure.

FIG. 2 illustrates a cross-section of various access points in the context of MDUs. Dormitory 201 includes rooms 203, conference room 205, restaurant 207 and lobby 209. The rooms 203, conference room 205, restaurant 207 and lobby 209 include various access points 221. Although illustrated as having one or more access points in each room, it is to be understood that fewer or more access points can be used. For example, in an implementation, a single access point can be used for multiple rooms. As will also be understood by those of skill in the art, many different types of facilities may benefit from the present disclosure. For example, although described mainly with respect to dormitories, other facilities can use the present network management system including apartment complexes, schools, colleges, universities, hospitals, hotels, government buildings, businesses, or any other public or private networking systems.

Casting Management System

Figure 3:
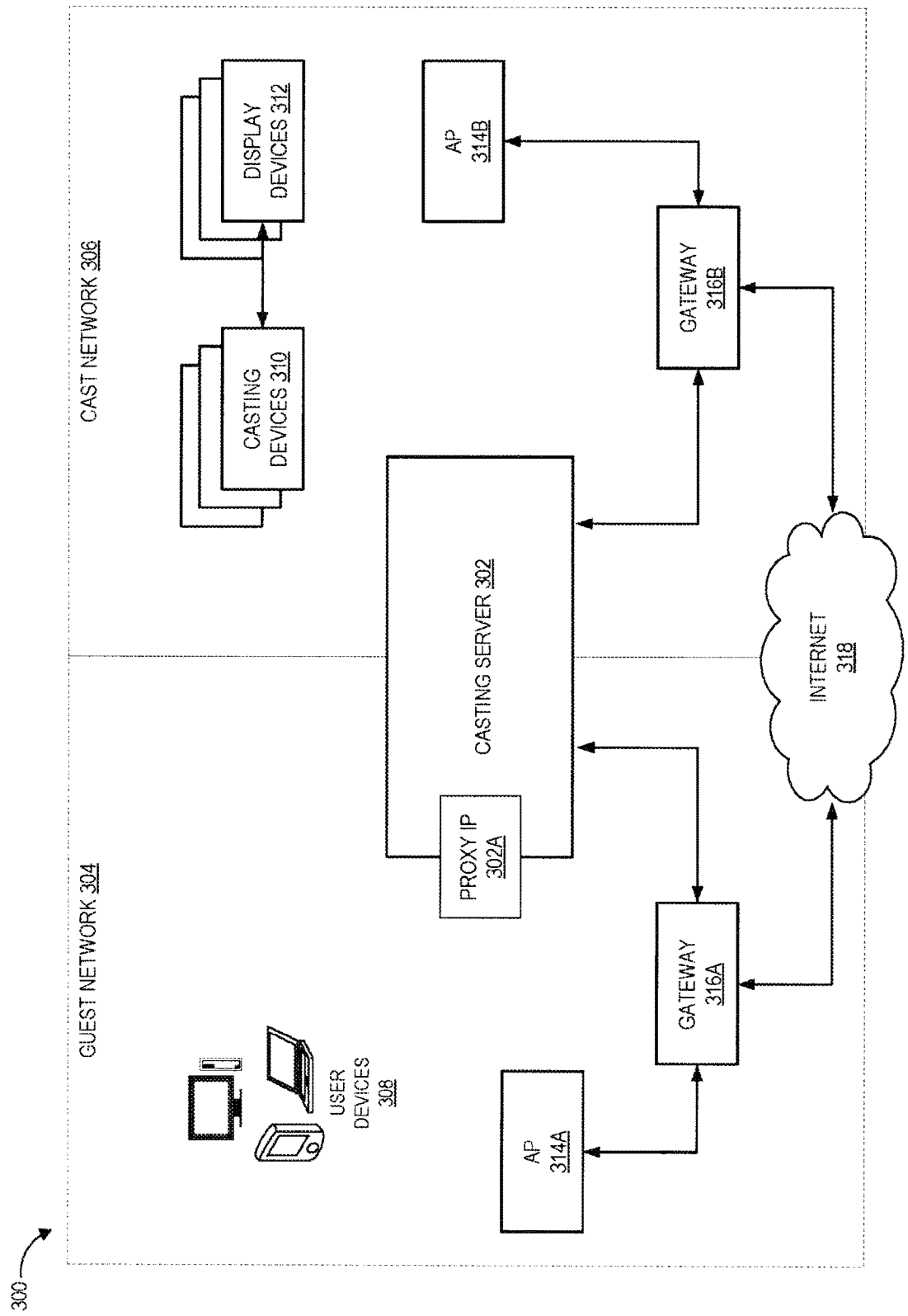
FIG. 3 illustrates a network environment including a casting server for controlling user access to casting devices and display devices in accordance with aspects of this disclosure.

FIG. 3 illustrates an embodiment of a networking environment 300 including a casting server 302. The casting server 302 is part of a guest network 304 and a cast network 306. The casting server connected to both the guest network and the cast network may provide protected connectivity or controlled connectivity between the two networks (e.g., between the user devices 308 (also referred to herein as guest devices 308) on the guest network and the casting devices 310 on the cast network).

In the example of a hotel, there may be a guest network (e.g., guest network 304) providing internet accessibility to the guests' mobile devices (e.g., user devices 308). There may be one or more access points (e.g., AP 314A) that provides the guest network to the guest devices. There may be a gateway (e.g., gateway 316A) providing access to other networks such as the Internet (e.g., Internet 318). The gateway can be a captive portal gateway, such as the Nomadix gateway. Thus, once a guest has joined the guest network and provided the information and/or payment required by the hotel, the guest may be allowed onto the Internet.

To deploy casting, another wireless network may be created (e.g., cast network 306). The cast network may have a separate wireless SSID different from that of the guest network. For example, all the casting devices deployed into the guest bedrooms may be instructed to connect to that special cast network SSID. The password to the cast network may not be provided to the guests to prevent guests from joining the cast network. For example, only the installers of the casting devices may know the password to the cast network. Thus, the cast network may be a secure network that only the casting devices are allowed onto.

The cast network may also include a gateway device (e.g., gateway 316B). This gateway device may be a standard IP gateway and not a captive portal gateway. For example, this gateway may be a router that provides unimpeded access to the Internet. When a guest accesses a casting device on the cast network and instructs to stream media onto the display device in communication with the casting device, the casting device may access the Internet via the gateway and access the media, and the IP traffic may flow through the cast network out to the storage location associated with the media (e.g., cloud storage server, "cloud" referring to a pool of network-accessible computing resources) and back down to the casting devices.

In some embodiments, the guest network and the cast network use two different wireless SSIDs. In other embodiments, the guest network and the cast network use the same wireless SSID. In some embodiments, the gateway device in the guest network is a captive portal gateway device, and the gateway in the cast network is a standard IP gateway device. In other embodiments, the gateway device in the guest network and the gateway in the cast network are both standard IP gateway devices. In yet other embodiments, the gateway device in the guest network and the gateway in the cast network use the same gateway device. In some of such embodiments, the same gateway devices are configured the same way (e.g., both as a standard IP gateway, both as a captive portal gateway, etc.). In other cases, the same gateway devices are configured differently (e.g., the one in the guest network is configured to operate as a captive portal gateway, and the one in the cast network is configured to operate as a standard IP gateway).

Discovery

When a guest opens up a video streaming app on her smartphone, the app may send out discovery packets on the guest network, looking for casting devices. For example, the app may send out multicast DNS requests or queries, looking for casting service. Typically, these requests are multicast or broadcast onto the Wi-Fi network, and any casting devices that happen to be on the network may respond. However, because the guest device is not on the same network as the casting devices, there may be no response to those mDNS queries in typical situations.

Here, the software on the casting server may listen for any such discovery requests coming in from guest devices, and makes a determination of whether to allow the guest device to see any of the casting devices on the cast network. In some embodiments, this decision is made based on whether there is a pairing that exists for the guest device with one or more casting devices on the other side of the network (e.g., on the cast network).

If such a pairing does not exist, the casting server may simply ignore the packet and nothing may happen. In such a case, there may be no response to the discovery requests and the guest device is going to think that there is no casting device available to talk to. On the other hand, if such a pairing exists, the casting server may send a response pretending to be a casting device that is on the cast network and provides an IP address that the guest device is expected to use to talk to the casting device. In some embodiments, this IP address is an actual IP address assigned to the casting device that the casting server is pretending to be. In other embodiments, the IP address is a proxy IP that is generated by the casting server (and is not identical to any actual IP addresses of the casting devices on the cast network). The guest device then uses the IP address to cast content onto the display device (e.g., a TV in the guest's hotel room) that is connected to or in network communication with the casting device.

Casting

Once a casting device has been discovered, the second phase is actually doing the casting. For example, the guest may open a media application on his or her smartphone, search for any available casting devices, and select a casting device that has appeared in the list of available casting devices (the discovery process above generates this list). In response to the selection, a TCP connection is formed with the IP address that the smartphone thinks belongs to the selected casting device and any control instructions such as to play or pause content may be sent to the IP address. In response, the casting server forwards the packets received from the smartphone to the appropriate casting device on the cast network. In some embodiments, the casting server may do so using destination network address translation (DNAT). In other embodiments, the casting server may forward the packets from one network to the other without translation.

Creating a Packet Forwarding Rule

When a pairing has been created, the casting server may create a packet forwarding rule that specifies that, when a guest device with a particular MAC address tries to open a TCP connection with this particular proxy IP, the packets may be forwarded to the appropriate casting device using destination NAT. There may be a flow of packets coming from the guest network, and the casting server may translate them to different destination IP addresses onto the casting devices on the cast network. This would allow the guest devices to connect to the casting devices. Additionally, there may be a reverse rule that allows traffic from the casting devices back to the guest devices. Thus, the casting server may create and/or install bidirectional rules for packet forwarding that allow that kind of TCP connection to take place. Additionally, the casting server may tear down the rules when they are no longer needed (e.g., when the given pairing is removed). Also, the casting server may indicate to the mDNS handler that there is a pairing so that the mDNS handler knows to respond to mDNS queries or not from guest devices.

Establishing Control Connection (TCP)

The casting devices may have special receiver applications for downloading the content to be cast onto the display devices. Such receiver applications may be registered by content creators with the casting devices such that the casting devices are shipped with the receiver applications or such that the receiver applications can be downloaded onto the casting devices. Once a control connection (e.g., TCP) is established between the guest device and the casting device via the casting server, the guest may provide control commands via the TCP connection such as play or pause content. When requested, the receiver application on the casting device may connect to the Internet and fetch the requested content without requiring the content to be streamed from the guest device.

Installation of Casting Devices

Additionally, the casting server may facilitate the installation of the casting devices. When the casting devices are being installed, the casting devices may be placed in rooms, and the casting server may detect new casting devices appearing on the cast network that the casting server does not already know about. The casting server may then register the casting device with a cloud service (e.g., in communication with the casting server 302 via the internet 318) configured to durably store pairing information so that the pairing information can be re-downloaded onto the casting server after the casting server is reset or rebooted. Further, the casting server may periodically send a report to the cloud service (e.g., the current list of casting devices that are online), and the cloud service may analyze the report and flag any issues (e.g., if a casting device that is expected to be on the list is missing, or if a casting device not recognized by the cloud service is on the list, etc.). When a casting device is not recognized by the casting server or the cloud service, the casting server may send a command to the casting device to cause the casting device to display information that can be used by an installer on a display device connected to the casting device. The information may include a QR code or a link that the installer can use to link the casting device to a particular room number or location. Once the location of the unrecognized casting device is identified, the casting server can cause the casting device to be entered into the record and set up the casting device for future use (e.g., cause the casting device to display pairing instructions for future guests).

Packet Handling Using Rules

In some embodiments, the casting server may read from a network connection on the guest network and output the same packet onto the cast network, where the casting server software is an application running outside the operating system. In some cases, such an approach may be too CPU intensive and may not scale as well. In other embodiments, packet forwarding rules is installed on the operating system of the casting server (e.g., Linux), and the operating system level packet forwarding rules are used instead in order to control which packets get forwarded from one network to the other. Here, the casting server may not route anything by default. If a packet is received by the casting server, and there is no specific rule to allow the packet to be transmitted to the other side, then the packet may just get dropped. To prevent that, a packet forwarding rule that specifies that guest device X can talk to casting device Y on the other network can be installed in the packet forwarding engine, which would allow packets from guest device X to flow to casting device Y, and back.

OS Packet Forwarding Rules and Improved Scaling

In some embodiments, using the operating system packet forwarding rules does not reduce the amount of traffic to and from the guest devices and the casting devices through the casting server, but due to the packet forwarding rules being configured to direct the packets to the appropriate destinations rather than having to rely on the casting server software to process the packets, the packets do not need to leave the operating system; they are received by the casting server network interface, processed by the operating system, and transmitted via the casting server network interface, bypassing the casting server software and eliminating the need to store the packets to be read by the casting server software (thereby reducing the amount of data copying). For example, the packet forwarding rules can specify whether a given guest device is allowed to communicate with a given casting device (or vice versa), and if the operating system determines that such communication is allowed, the IP address is translated and the packet is passed along to the recipient; otherwise, the packet is dropped.

Multicast DNS Response

In some embodiments, the casting server, upon receiving a multicast DNS packet, would forward the packet to the casting devices. In other embodiments, the casting server does not forward any mDNS queries and instead fake a response from the casting device without actually forwarding the mDNS queries to the casting device (e.g., by caching the response from the casting device). For example, when there is an mDNS query, the casting server may figure out whether the guest device has been paired to a casting device and then the casting server may fake the response from that particular paired casting device only.

Pairing Process

When the guest checks into her room and turns on the TV (if the TV is not already on), she may see a welcome screen with casting instructions. This may include a QR code that, upon activation, would cause the guest's smartphone to contact the casting server via the guest network (or over the Internet). The casting server captures the guest's IP address and/or MAC address and creates and stores (e.g., in the cloud or local storage) a pairing between the guest's smartphone and one or more casting devices in the guest's room. Once the pairing has been created, the casting server may create one or more packet forwarding rules and allow mDNS discovery to occur for the guest's smartphone. In some embodiments, in response to receiving a new pairing from the casting server, the cloud service may check if the new pairing already exists in the current pairings, and if so, rejects the request to add a pairing. If the new pairing does not currently exist, the cloud service may instruct the casting server to create a packet forwarding rule for the pairing and enable mDNS discovery for the pairing.

Room with Multiple Casting Devices

Larger hotels may have suites, which may have multiple casting devices and/or display devices. Once a pairing is created with one of such casting devices, the casting server may determine that the guest device is also to be paired with other casting devices in the same room/unit/suite and create additional pairings accordingly. Multiple proxy IP addresses (e.g., proxy IP 302A) would allow guests to be able to distinguish between multiple casting devices they have access to in the their rooms and specify which casting device they wish to use.

Removal of Pairings

When a pairing is to be removed, the casting server simply removes the packet forwarding rules. For example, a table of rules (which may be a whitelist of packets, or sources and destination pairs that are allowed to pass) is maintained in a storage accessible by the casting server. If a packet comes in, and there isn't a whitelist rule for it, the packet gets dropped. In order to remove a pairing, an administrator may send the casting server a message from the cloud system to remove this pairing. Then, the casting server may delete the rules that allow forwarding between this guest device and that casting device the pairing was created for. A pairing may be removed when the guest checks out, or according to a schedule (e.g., every day at 1 pm).

Automatic Pairing

In some embodiments, when a guest wants to connect to the Wi-Fi network, the guest is directed to captive portal system on the guest network. When that captive portal system learns about the guest's location (e.g., room 105), the captive portal system may send that information to the casting server, which can then automatically create a pairing to allow the guest's mobile devices to connect to the casting devices in the guest's room. In such a case, when the guest turns on the TV, instead of pairing instructions (e.g., along with a QR code), other content and/or an indication that the pairing has been created may be displayed.

Alternative Approach

Figure 4:
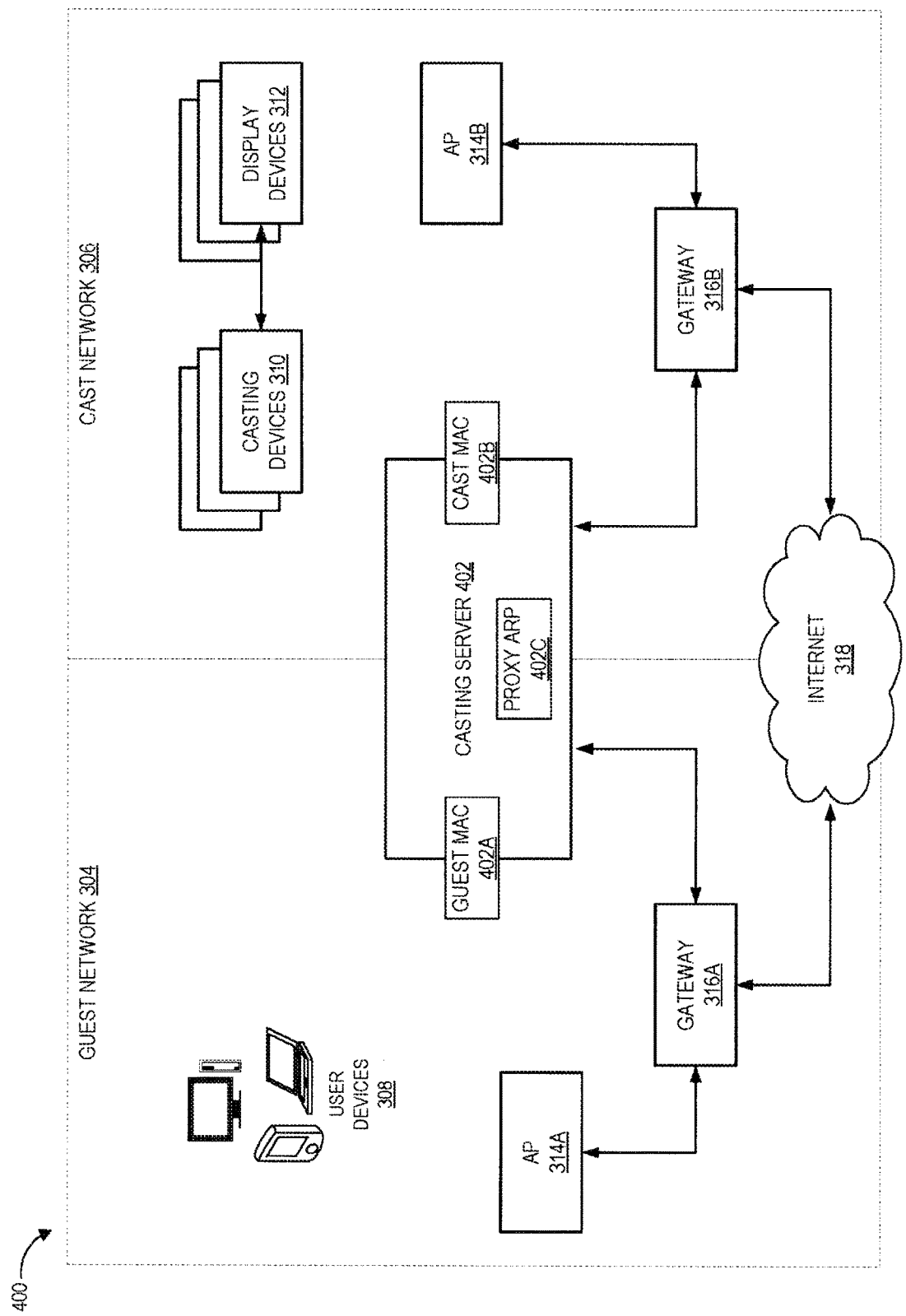
FIG. 4 illustrates a network environment including another casting server for controlling user access to casting devices and display devices in accordance with aspects of this disclosure.

FIG. 4 shows an alternative embodiment in which proxy ARP and proxy MAC addresses are used by the casting server. In some embodiments, the guest network and the cast network may have completely different IP subnets. In the embodiment shown in FIG. 4, the cast side of the network may be a subset of the full network address range on the guest side of the network. For example, if the guest network has an IP range of 10.2.0.0, that would be a 16 bit netmask. Here, roughly half of the addresses in that address space may be allocated to the guest devices, and the other half may get allocated to the cast side of the network. Thus, the casting server aside, to an external observer, it may look as if the casting devices and the guest devices were part of the same network.

Proxy ARP

The example of FIG. 4 may use a technique called proxy ARP, which means that when a device on one side of the network wants to communicate with another device on the other side of the network, the device may need to figure out how to address one of these IP addresses on the other side. A guest device may send out an ARP request requesting the MAC address of the computer on the network that has a specific IP address, and normally, if the casting server did not exist, the casting device would respond directly and indicate that the casting device has that IP address, and provide the MAC address of the casting device, and then the two computers would be able to communicate directly.

However, when the casting server is introduced, the casting server gets in the way, and the casting server may return its own MAC address. When a guest device requests the MAC address of the casting device that the guest device may communicate with, the guest device may receive a response from the casting server including the MAC address of the casting server (instead of the MAC address of any casting device). Thus, all communications going to any device on the cast side of the network effectively get sent through the casting server. The proxy ARP may cause any traffic configured to reach the computers on the other side of the network (e.g., the casting devices) to be forced through the casting server (the proxy ARP may do the same for the traffic in the reverse direction). Here, when a casting device wants to communicate with a guest device, the casting device provides an ARP request, and the casting device is provided a MAC address of the cast side of our server, which forces any traffic that the casting device has for the guest side of the network to go through the casting server.

Difference Between Requests

When a guest device sends a request to cast to a TV in the living room, and another request to cast to a TV in the bedroom, the two requests may have the same guest side MAC address, but two different IP addresses of the respective casting devices connected to the two TVs. In some embodiments, proxy IPs are used to communicate with different casting devices. In other embodiments, actual IPs are used to communicate with different casting devices (with a proxy MAC). For example, the proxy IPs may be reused for each hotel room, and requests sent from two different guest devices in two different rooms to the same proxy IP address may be directed to two different casting devices.

Sending Discovery Packets to Multiple Guest Devices

In some embodiments, the discovery takes place directly between the guest device and the casting server, and discovery packets are not allowed to flow through the casting server to the other side. In other embodiments, discovery requests are passed through the casting server to the other side, and the casting devices can respond. The casting server may then decide if the response is to be allowed to reach back to the guest devices or not based on pairings. If one guest device tries to discover casting devices in a room, the casting server may send discovery replies out to all of the guest devices in the same room so that the guest devices can all access all of the casting devices, which makes it so that the room appears like a small network where everything in the room can see everything else.

For example, if a guest has a smartphone and a tablet in a hotel room, when the guest opens a streaming application and looks for casting devices to connect to, the discovery packets from the available casting devices may be sent to the smartphone, indicating that the casting devices are available for casting. In addition, the discovery packets may also be sent to the guest's tablet (assuming that the guest's table has already been paired with the casting devices and is currently turned on), essentially letting the tablet know that the casting devices are available for casting. For example, if the guest's tablet is off, the discovery packets cannot be transmitted. The local AP would receive the discovery packets but the AP would determine that no device is listening at the MAC address associated with the guest's tablet. If the guest's tablet is on, the tablet may store (e.g., in a cache) the information included in the discovery packets (e.g., information regarding the casting devices that are available for use) so that when the guest later wishes to cast content onto one of the casting device, the cached information regarding the available casting devices would allow the mobile application to quickly populate them for the guest's selection via the tablet. Additionally, the tablet may automatically transmit another discovery request to the casting server to obtain an updated list of casting devices available for use.

In some embodiments, the casting server may periodically go through all the pairings, and announce to each paired guest device a list of all the casting devices available to that paired guest device. For example, in some cases, multicast DNS queries may be blocked by the network for security reasons. In such cases, the guest devices would obtain information regarding available casting devices through such periodic announcements from the casting server.

Example Architecture of Casting Server

Figure 5:
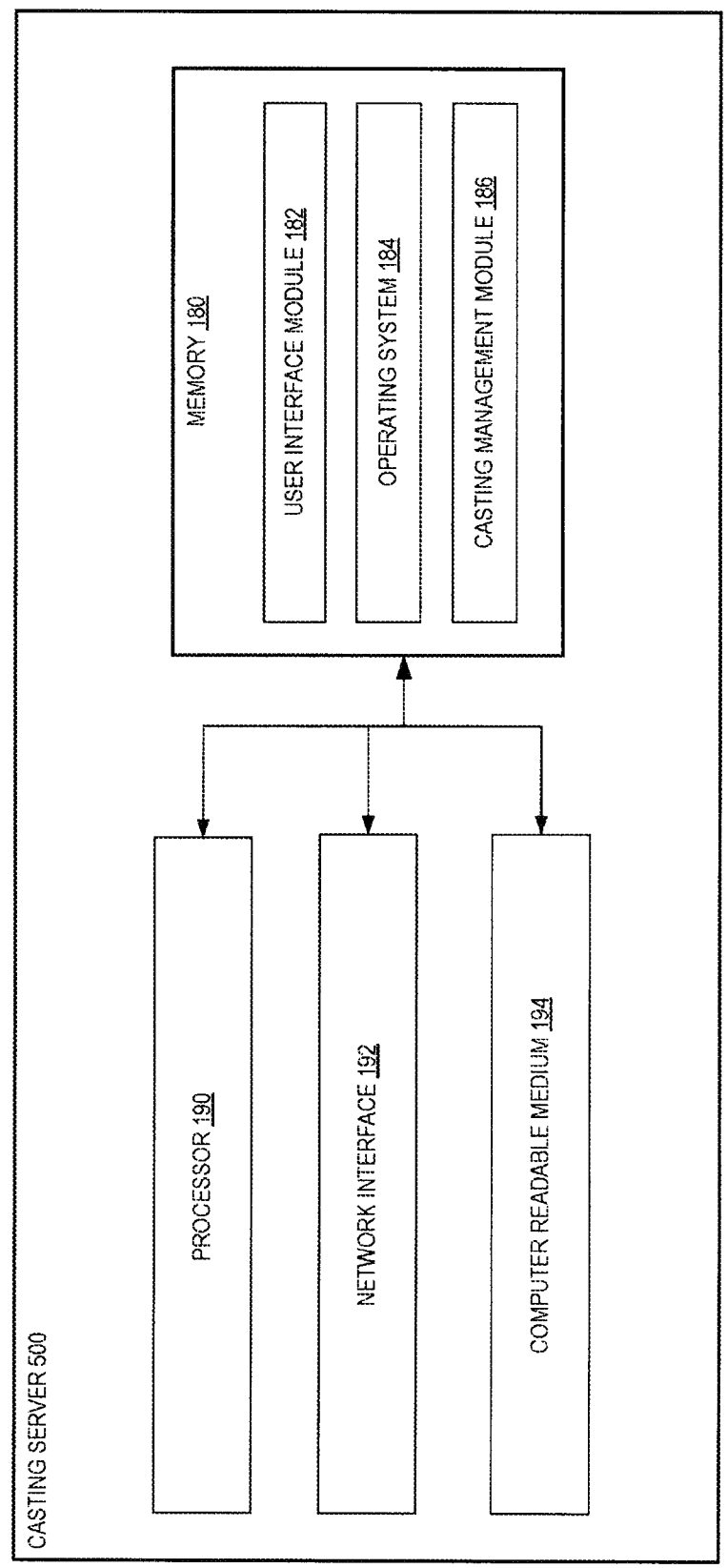
FIG. 5 illustrates a general architecture of a computing device or system providing a casting management service in accordance with aspects of the present disclosure.

FIG. 5 depicts an example architecture of a computing system (referred to as the casting server 500) that can be used to perform one or more of the techniques described herein or illustrated in FIGS. 1-4 and 6-12. The general architecture of the casting server 500 depicted in FIG. 5 includes an arrangement of computer hardware and software modules that may be used to implement one or more aspects of the present disclosure. The casting server 500 may include many more (or fewer) elements than those shown in FIG. 5. It is not necessary, however, that all of these elements be shown in order to provide an enabling disclosure. As illustrated, the casting server 500 includes a processor 190, a network interface 192, and a computer-readable medium 194, all of which may communicate with one another by way of a communication bus. The network interface 192 may provide connectivity to one or more networks or computing systems. The processor 190 may thus receive information and instructions from other computing systems or services via one or more of the networks shown in FIGS. 3 and 4.

The processor 190 may also communicate with memory 180. The memory 180 may contain computer program instructions (grouped as modules in some embodiments) that the processor 190 executes in order to implement one or more aspects of the present disclosure. The memory 180 may include RAM, ROM, and/or other persistent, auxiliary, or non-transitory computer-readable media. The memory 180 may store an operating system 184 that provides computer program instructions for use by the processor 190 in the general administration and operation of the casting server 500. The memory 180 may further include computer program instructions and other information for implementing one or more aspects of the present disclosure. For example, in one embodiment, the memory 180 includes a user interface module 182 that generates user interfaces (and/or instructions therefor) for display upon a user computing device (e.g., user computing device 308 of FIG. 3), e.g., via a navigation and/or browsing interface such as a browser or application installed on the user computing device. In addition, the memory 180 may include or communicate with one or more data stores.

In addition to and/or in combination with the user interface module 182, the memory 180 may include a casting management module 186 that may be executed by the processor 190. In one embodiment, the casting management module 186 implements various aspects of the present disclosure, e.g., those illustrated in FIGS. 1-4 and 6-12 or described with reference to FIGS. 1-4 and 6-12.

Although a single processor, a single network interface, a single computer-readable medium, and a single memory are illustrated in the example of FIG. 5, in other implementations, the casting server 500 can have a multiple of one or more of these components (e.g., two or more processors and/or two or more memories).

Client Isolation

A network may perform client isolation (e.g., L2 client isolation), which means that if a wireless network has multiple guest devices, the guest devices are not allowed to talk to each other, and the network is going to block or drop any packets that are sent directly between them. In such cases, the guest devices may be allowed to communicate only with the default gateway.

Whitelist

A network may also maintain a whitelist that would allow the guest devices to communicate directly with any device on the whitelist other than the default gateway. In the casting context, the casting servers that are implemented separately from the gateway can be added to the whitelist so that the guest devices could communicate directly with the casting servers.

Default Gateway

When a guest device joins the network, the guest device may issue a DHCP request indicating that an IP address is needed, to which the network responds with a DHCP offer, providing an IP address. The guest device can subsequently accept the IP address in another DHCP request, to which the network responds with a DHCP ACK. The network also tells the guest device the DNS server and the default gateway.

Casting Solution without Whitelist

Figure 6:
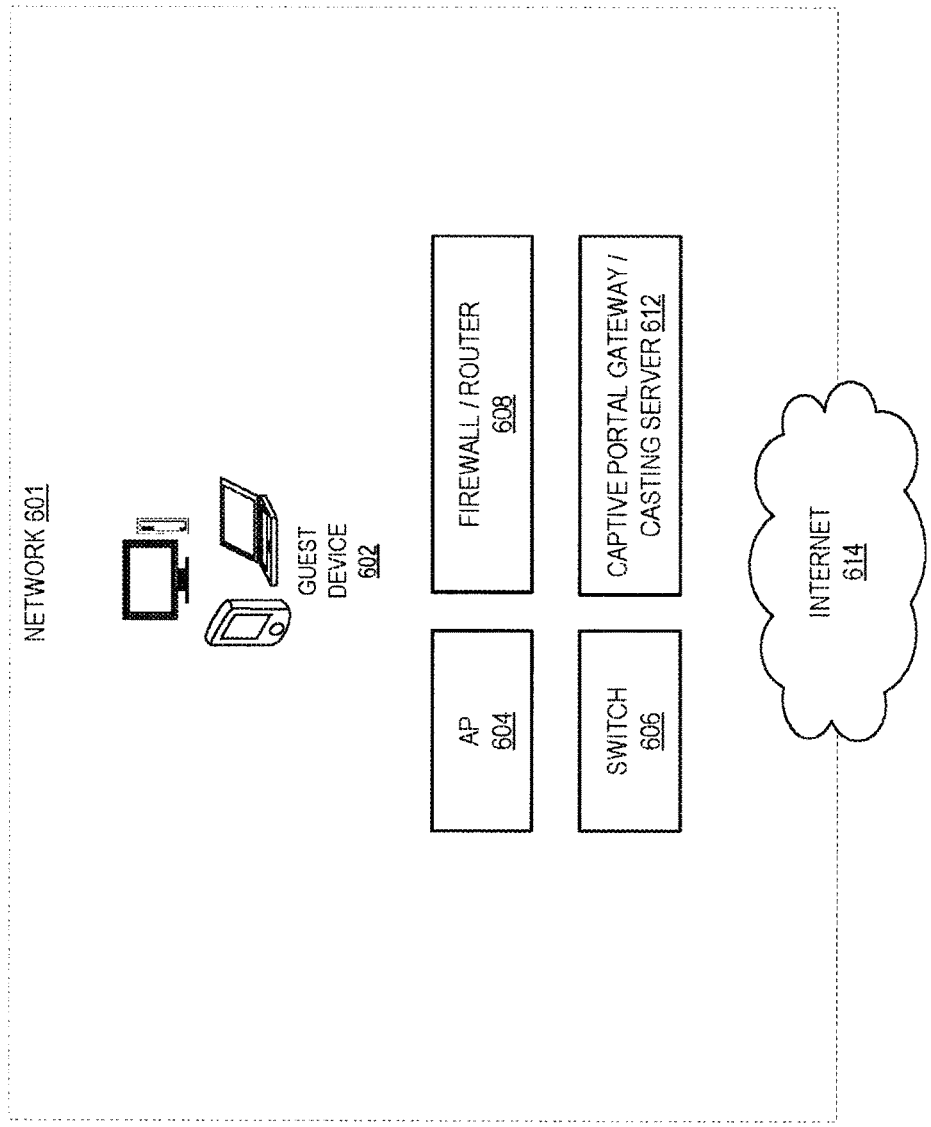
FIG. 6 illustrates a network environment including another casting server for controlling user access to casting devices and display devices in accordance with aspects of this disclosure.

To support casting on certain types of wireless networks, the default gateway (e.g., the captive portal gateway) may double as the casting service gateway. This may be applicable when the network has been configured to enforce client isolation such that guest devices can only communicate with their default gateway, and not with any other devices connected to the network. An example is shown in FIG. 6, which includes network 601, guest device 602, access point 604, switch 606, firewall/router 608, captive portal gateway/casting server 612, and the Internet 614. As shown in FIG. 6, the default gateway (e.g., the captive portal gateway) doubles as the casting service gateway, and vice versa.

Consequently, the default gateway may be configured to respond to mDNS queries from guest devices and facilitate the bridging or routing of control connections between guest and Chromecast® or other casting devices.

In some cases, the network may be configured to block multicast mDNS messages from guest devices attempting to discover available casting devices and/or services. In such cases, in some implementations, the only way to discover available casting devices and/or services may be for guest devices to listen passively to the periodic announcements issued by the casting devices and/or services.

In some embodiments, the casting services and techniques described herein can be built into the same server as that of the gateway (e.g., captive portal gateway). In other embodiments, it may be difficult to build such casting services and techniques into the same server as the gateway (e.g., Nomadix Service Engine or NSE). In some of such embodiments, a bridging or routing feature can be built into the gateway (e.g., by way of a firmware update on the gateway device), which could enable a separate casting server (e.g., casting server separate from the gateway) to receive and process casting traffic from a subscriber authorized to connect to the network (e.g., over the virtual LAN or VLAN).

On the subscriber side of the gateway, the gateway can be configured to recognize one or more IP addresses as providing casting services. These IP addresses could be from the subscriber VLAN (i.e., same subnet) or could be on another subnet to which the gateway could route traffic.

If a guest device on the subscriber VLAN sends traffic to one of the configured casting IP addresses (also referred to herein as casting IPs), the gateway can bridge or route those packets to a casting server directly connected to the gateway on an Ethernet port (or alternatively, to a casting server that is connected via another intermediary device such as a switch or a collection of switches).

In such embodiments, the gateway may respond to ARP requests (e.g., from the guest devices) for the casting IP addresses, providing its own MAC (e.g., NSE MAC below) in the reply packets.

Casting packets from the guest devices may be structured as follows:
  L2: src=guest MAC, dst=NSE MAC
  L3: src=guest IP, dst=Casting IP
  L4: may or may not consider (e.g., could be UDP or TCP)
  where L2 refers to layer 2 of the ISO networking model responsible for transferring data between adjacent network nodes, L3 refers to layer 3 of the ISO networking model responsible for routing data between different networks using IP addresses, and L4 refers to layer 4 of the ISO networking model responsible for enabling communication between processes or applications running on different hosts.

Assuming TCP, the guest device would believe that the guest device is opening a connection to the casting IP address, which is being represented (or proxied) by the NSE. Further assuming that an available ethernet port on the NSE has been configured as a casting bridge, when traffic to a casting IP address is received by the NSE on a subscriber VLAN, the NSE may re-transmit the packets on the casting ethernet port (e.g., default gateway reads the destination MAC address and forwards the MAC address directly to the specific port the MAC address is plugged into, e.g., the ethernet port to which the casting server is connected).

Here, the packets may have their DST MAC (destination MAC address) changed to that of the casting server. It is assumed that the casting server may accept packets for the casting IPs. Upon re-transmission, the SRC MAC can be preserved to be that of the guest device. By doing so, guest devices can be tracked by MAC address. It is possible to track by IP instead, but IP addresses can change much more frequently than MAC addresses, so it can be more reliable to track guest devices by MAC.

A re-transmitted packet may therefore be structured as follows:
  L2: src=guest MAC, dst=casting server MAC
  L3: src=guest IP, dst=casting server IP
  L4: preserved In this example, L3 and above are preserved. The NSE may perform ARP for the casting IP on the bridge port to discover the appropriate casting server MAC.

When the casting server has response traffic to return to a guest device, the casting server may transmit a packet structured as follows:
  L2: src=casting server MAC, dst=?? (e.g., NSE MAC or proxy MAC)
  L3: src=casting server IP, dst=guest IP
  L4: may or may not consider Here, the DST MAC would normally be the result of performing ARP for the guest IP. In this case, the NSE may respond to these ARP requests by looking up the subscriber IP in the subscriber table to make sure the subscriber (e.g., guest device) is known, and then respond with its own MAC. Thus, the NSE may act as a proxy for the subscriber guest devices.

When the NSE receives the packet from the casting server, the NSE may use the subscriber table to look up the guest device's MAC address, and forward the MAC address to the guest device using the stored MAC. L3 and above may be preserved.

Described in this manner, the NSE can be viewed as providing a routing service for particular IPs configured as casting IPs. If the IPs are on the same subnet, the NSE may proxy ARPs for them. If they are not on the same subnet, the guest devices may try to route to them normally via their default gateway IP.

The mechanisms described above provide for handling control traffic (e.g., Chromecast® control traffic) used for casting. However, a means to facilitate casting discovery may also be provided, which may involve two components:

(1) receiving mDNS queries from guest devices, and
(2) Sending unsolicited announcements (e.g., Chromecast® announcements) from the casting server to guest devices.

For (1), the NSE may be configured to listen on UDP port 5353 for mDNS packets addressed to either 224.0.0.251 (and a multicast MAC) or one of the configured casting IPs (and the NSE's MAC). These packets can be re-transmitted to the casting server changing only the DST MAC to match that of the casting server. Thus, the handling can be the same as the control traffic from guest device to casting IP.

For (2), mDNS announcements may involve packets that are structured as follows:

L2: src=casting server MAC, dst=guest MAC
L3: src=casting server IP, dst=224.0.0.251
L4: UDP src/dst=5353
mDNS: A record=casting server IP In this example, the packets are multicast at L3, but unicast at L2. This may allow the system to answer a guest device multicast query with a unicast response (so other guest devices do not see the response). If a multicast DST MAC is used, every guest device on the network may see the announcement.

In some embodiments, the NSE MAC is used as the DST MAC and the packet is forwarded to the guest device as done for normal control traffic in some cases. However, in the case of multicast IP, the DST IP may not be able to be used to look up MAC addresses in the subscriber table. To resolve this issue, in some cases, the packet may be transmitted to the NSE as follows:

L2: src=guest MAC, dst=NSE MAC
L3: same as above
L4: same
mDNS: same

Here, the SRC MAC is set to the intended guest MAC rather than the casting server's MAC as one would normally expect. The NSE could handle these packets by noting that the DST IP is multicast and using the inbound SRC MAC as the DST MAC for re-transmission. The NSE may set its own MAC as the SRC MAC. This solution may generate non-standard packets, but could resolve the issue identified above.

Another solution could be to always set the DST IP to be the intended guest IP and the L2 addresses as one would normally expect. When the NSE receives the packet, the NSE can detect that the packet comprises an mDNS announcement using the L4 header. The NSE can find the intended recipient using the DST IP, and look up the correct DST MAC for re-transmission.

In some cases, the DST IP can be substituted to be 224.0.0.251, but only if the mDNS packet indicates that it is a multicast response. In other cases, this substitution is performed regardless of whether the packet is unicast or multicast. In some cases, whether the substitution is performed depends on detecting whether DST PORT is not 5353. In other cases, there may be a flag in the mDNS response that indicates if it answers a unicast or multicast query. If so, that flag can be used to determine whether to substitute.

Dual-Network Casting System

Figure 7:
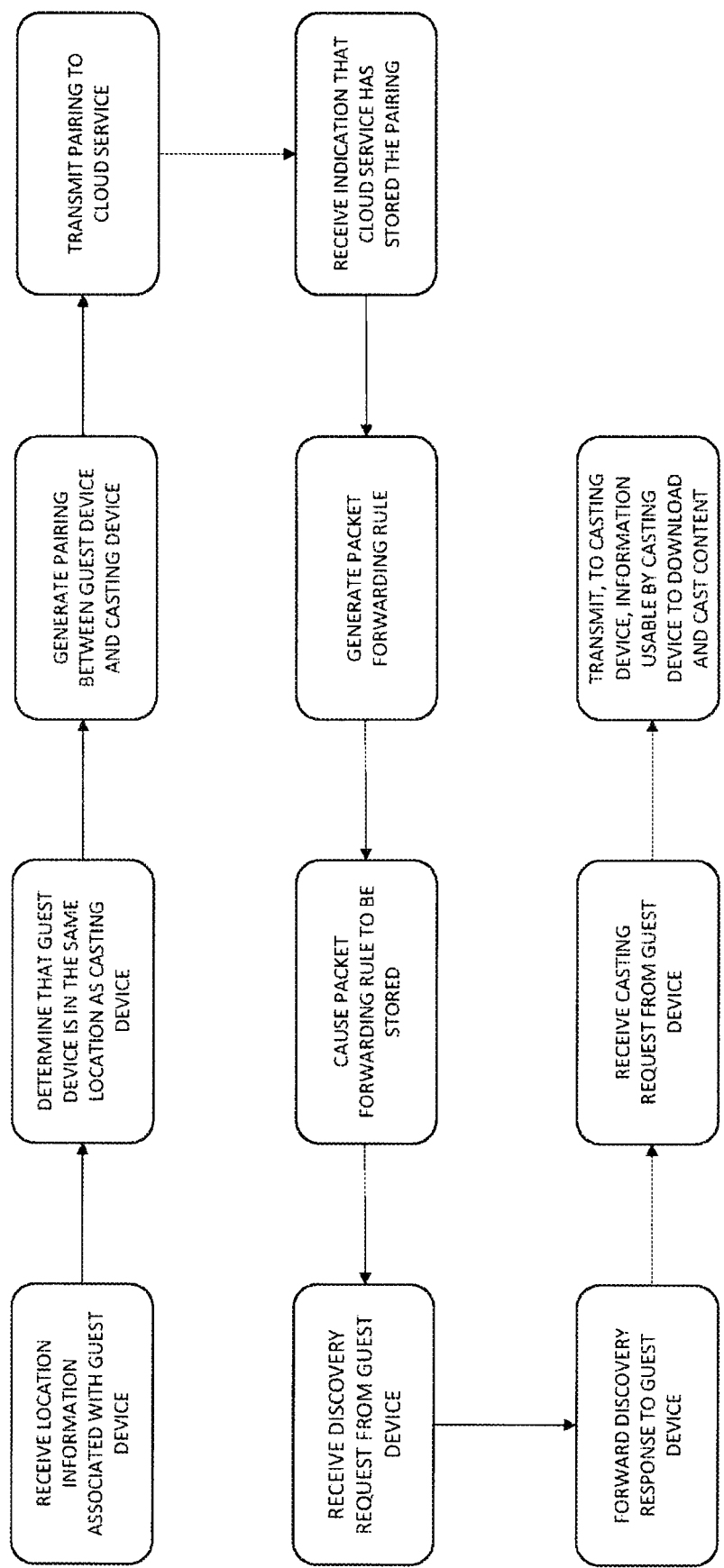
FIG. 7 illustrates a how a casting server may operate in accordance with aspects of this disclosure.

FIG. 7 describes how a casting server 302 may operate in a dual-network casting system in accordance with aspects of this disclosure. The casting server 302 is in network communication with the casting device 310 over a cast network 306, and the casting server 302 is in network communication with the guest device 308 over a guest network 304 separate from the cast network 306. When a guest attempts to connect her guest device 308 (e.g., a smartphone) to one or more of the display devices 312 (e.g., a TV) (e.g., by activating a QR code displayed on the TV), the casting server 302 receives location information associated with the guest device 308 and a MAC address associated with the guest device 308. For example, the location information may be an indication of the current location of the guest device 308. As another example, the location information may be an indication of the display device 312 displaying the QR code that was scanned by the guest. As another example, the location information may be embedded in the QR code or a link scanned and/or activated by the guest device 308.

The casting server 302 then determines whether the guest device 308 in the same location as the casting device 310 based on the location information. In some embodiments, the casting server 302 may determine the room to which the guest or the guest device has been assigned, and determine whether the room matches the room in which the casting device 310 and/or the display device 312 is located. If the guest device 308 and the casting devices 310 are in the same location, the casting server 302 generates a pairing between the guest device 308 and the casting device 310 using the MAC address of the guest device 308 (or the IP address of the guest device in some other cases). Then the casting server 302 transmits the pairing to a cloud service, which may be configured to manage and monitor a plurality of pairings on behalf of the casting device 310. The cloud service then stores the pairing generated by the casting server 302.

After the pairing is stored, the casting server 302 generates a packet forwarding rule to transmit one or more network packets from the guest device 308 to the casting device 310 and/or from the casting device 310 to the guest device 308. Thus, the casting server 302 may generate a bidirectional packet forwarding rule that allows the guest device 308 to communicate with one or more of the casting devices 310. In some other embodiments, the packet forwarding rule may be a unidirectional packet forwarding rule, or a pair of unidirectional packet forwarding rules configured to operate as a bidirectional packet forwarding rule. The packet forwarding rule may be then stored in a storage device (such as a cloud service, a hard disk drive, or RAM) accessible by the casting server 302.

When the casting server 302 receives a discovery request from the guest device 308 to discover a casting device 310, the casting server 302 forwards a discovery response back to the guest device 308 including a proxy IP address usable by the guest device 308 to communicate with the casting device 310 based on the packet forwarding rule and with or without communicating with the casting device 310, then the casting server 302 receives a casting request from the guest device 308 that indicates the proxy IP address, and then the casting device 310 can download a requested content from the Internet and cast the requested content onto the display device 312 in communication with the casting device 310, for example, using the information transmitted to the casting device by the casting server. Such information can include the location of the content, required credentials, etc., among others.

Communication Among Guest Device, Casting Device, and Casting Server

Figure 8:
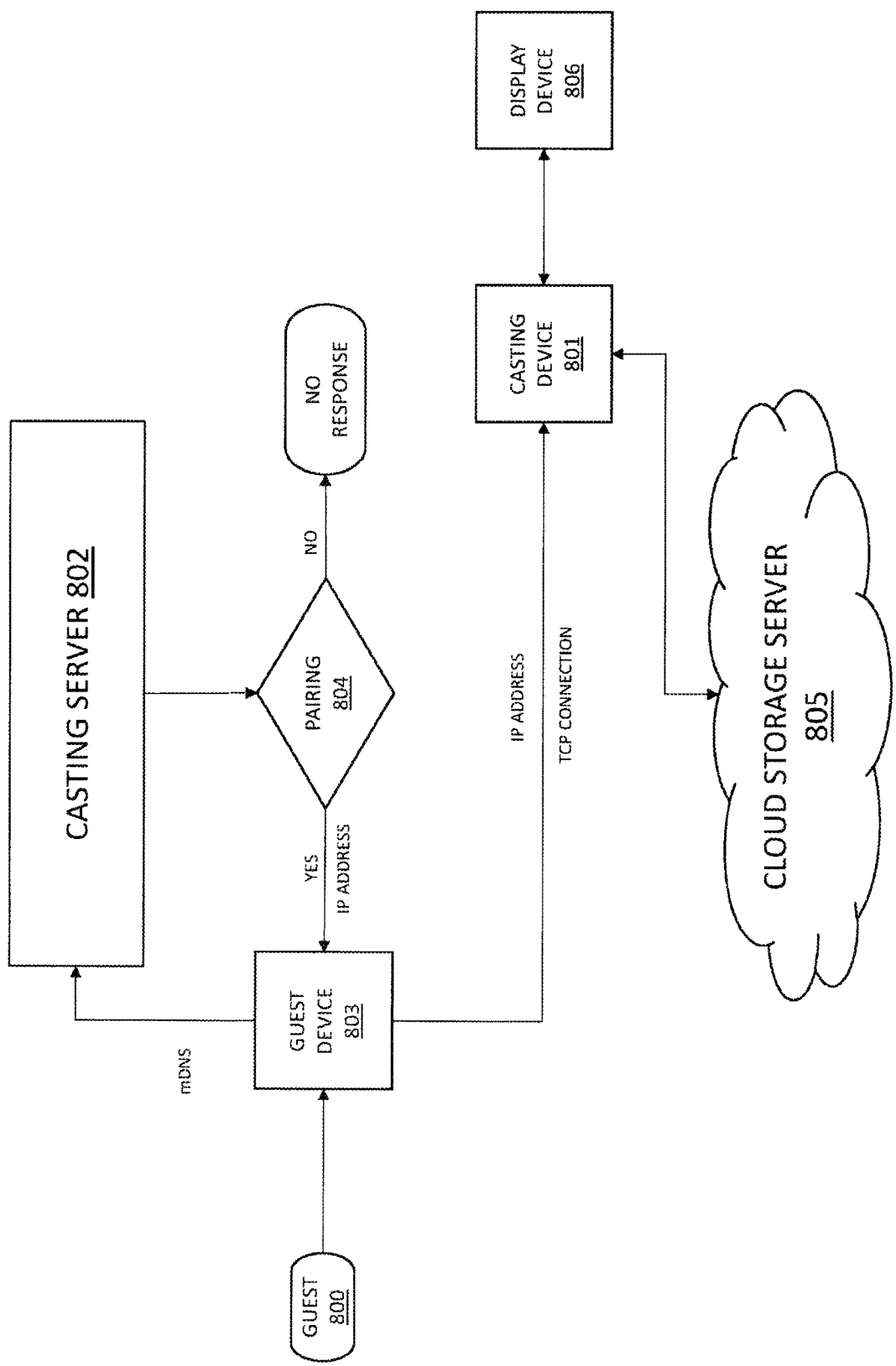
FIG. 8 illustrates how a guest may interact with a casting server to connect user devices to a casting device in accordance with aspects of this disclosure.

FIG. 8 illustrates the process of how a guest 800 communicates with a casting device 801 via a casting server 802. When a guest 800 opens up a video streaming app on her guest device 803 (e.g., a smartphone), the app may send out discovery packets on the guest network, looking for a casting device 801. For example, the app may send out multicast DNS requests or queries, looking for casting service. Typically, these requests are multicast or broadcast onto the Wi-Fi network, and any casting devices that happen to be on the network may respond. However, because the guest device 801 is not on the same network as the casting devices, there may be no response to those mDNS queries in typical situations.

Here, the software on the casting server 802 may listen for any such discovery requests coming in from the guest device 803, and makes a determination of whether to allow the guest device to see any of the casting devices on the cast network. In some embodiments, this decision is made based on whether there is a pairing 804 that exists for the guest device with one or more casting devices on the other side of the network (e.g., on the cast network).

If such a pairing 804 does not exist, the casting server 802 may simply ignore the packet and nothing may happen. In such a case, there may be no response to the discovery requests and the guest device 803 is going to think that there is no casting device available to talk to. On the other hand, if such a pairing 804 exists, the casting server 802 may send a response pretending to be a casting device that is on the cast network and provides an IP address that the guest device 803 may use to talk to the casting device 801. In some embodiments, this IP address is an actual IP address assigned to the casting device that the casting server is pretending to be. In other embodiments, the IP address is a proxy IP that is generated by the casting server (and is not identical to any actual IP addresses of the casting devices on the cast network). The guest device then uses the IP address to cast content onto the display device 806 (e.g., a TV in the guest's hotel room) that is connected to or in network communication with the casting device 801.

Once a casting device 801 has been discovered, the second phase is actually doing the casting. For example, the guest 800 may open a media application on his or her guest device 803 (e.g., smartphone), search for any available casting devices, and select a casting device that has appeared in the list of available casting devices (the discovery process above generates this list). In response to the selection, a TCP connection is formed with the IP address that the smartphone thinks belongs to the selected casting device 801 and any control instructions such as to play or pause content may be sent to the IP address. In response, the casting server 802 forwards the packets received from the guest device 803 to the appropriate casting device 801 on the cast network. In some embodiments, the casting server 802 may do so using destination network address translation (DNAT). In other embodiments, the casting server 802 may forward the packets from one network to the other without translation.

Generation of Packet Forwarding Rules

Figure 9:
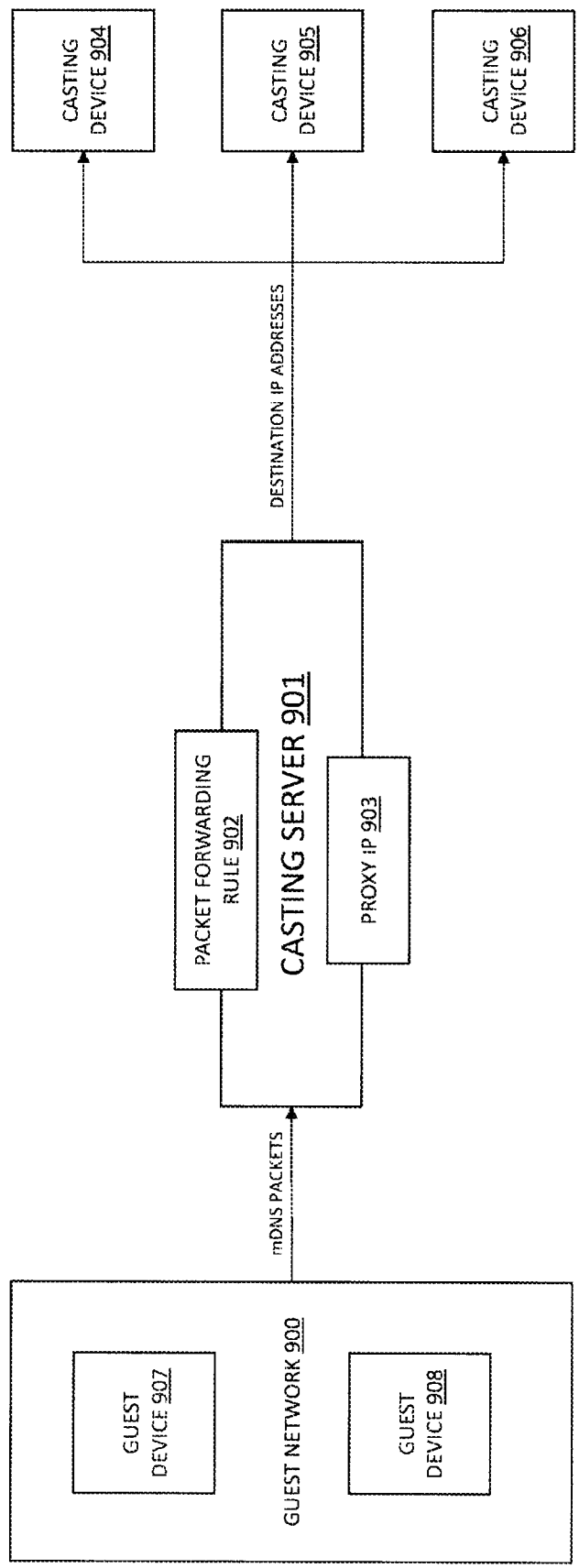
FIG. 9 illustrates how a casting server may create rules and pair devices in accordance with aspects of this disclosure.

FIG. 9 illustrates the process of generating packet forwarding rules 902 by a casting server 901 to form a TCP connection between the guest devices 907, 908 and casting devices 904, 905, 906. When a pairing has been created, the casting server 901 may create a packet forwarding rule 902 that specifies that, when a guest device 907, 908 with a particular MAC address tries to open a TCP connection with this particular proxy IP 903, the packets can be forwarded to the appropriate casting device 904, 905, 906 using destination NAT. There may be a flow of packets coming from the guest network 900, and the casting server 901 may translate them to different destination IP addresses onto the casting devices 904, 905, 906 on the cast network. This would allow the guest devices 907, 908 to connect to the casting devices. Additionally, there may be a reverse rule that allows traffic from the casting devices back to the guest devices. Thus, the casting server 901 may create and/or install bidirectional rules for packet forwarding that allow that kind of TCP connection to take place. Additionally, the casting server 901 may tear down the rules when they are no longer needed (e.g., when the given pairing is removed). Also, the casting server 901 may indicate to the mDNS handler that there is a pairing so that the mDNS handler knows to respond to mDNS queries or not from guest devices.

The casting devices 904, 905, 906 may have special receiver applications for downloading the content to be cast onto the display devices. Such receiver applications may be registered by content creators with the casting devices such that the casting devices 904, 905, 906 are shipped with the receiver applications or such that the receiver applications can be downloaded onto the casting devices. Once a control connection (e.g., TCP) is established between the guest devices 907, 908 and the casting devices 904, 905, 906 via the casting server 901, the guest may provide control commands via the TCP connection such as play or pause content. When requested, the receiver application on the casting devices 904, 905, 906 may connect to the Internet and fetch the requested content without requiring the content to be streamed from the guest devices 907, 908.

In some embodiments, the casting server 901 may read from a network connection on the guest network 900 and output the same packet onto the cast network, where the casting server software is an application running outside the operating system. In some cases, such an approach may be too CPU intensive and may not scale as well. In other embodiments, the packet forwarding rule 902 is installed on the operating system of the casting server 901 (e.g., Linux), and the operating system level packet forwarding rules are used instead in order to control which packets get forwarded from one network to the other. Here, the casting server 901 may not route anything by default. If a packet is received by the casting server 901, and there is no specific rule to allow the packet to be transmitted to the other side, then the packet may just get dropped. To prevent that, a packet forwarding rule 902 that specifies that guest device X can talk to casting device Y on the other network can be installed in the packet forwarding engine, which would allow packets from guest device X to flow to casting device Y, and back.

In some embodiments, using the operating system packet forwarding rules does not reduce the amount of traffic to and from the guest devices 907, 908 and the casting devices 904, 905, 906 through the casting server 901, but due to the packet forwarding rules 902 being configured to direct the packets to the appropriate destinations rather than having to rely on the casting server software to process the packets, the packets do not need to leave the operating system; they are received by the casting server network interface, processed by the operating system, and transmitted via the casting server network interface, bypassing the casting server software and eliminating the need to store the packets to be read by the casting server software (thereby reducing the amount of data copying). For example, the packet forwarding rules 902 can specify whether a given guest device 907/908 is allowed to communicate with a given casting device 904/905/906 (or vice versa), and if the operating system determines that such communication is allowed, the IP address is translated and the packet is passed along to the recipient; otherwise, the packet is dropped.

In some embodiments, the casting server 901, upon receiving a multicast DNS packet, would forward the packet to the casting devices 904, 905, 906. In other embodiments, the casting server 901 does not forward any mDNS queries and instead fake a response from the casting device 904/905/906 without actually forwarding the mDNS queries to the casting device 904/905/906 (e.g., by caching the response from the casting device 904/905/906). For example, when there is an mDNS query, the casting server 901 may figure out whether the guest device 907/908 has been paired to a casting device 904/905/906 and then the casting server 901 may fake the response from that particular paired casting device only.

Creation and Removal of Pairings

Figure 10:
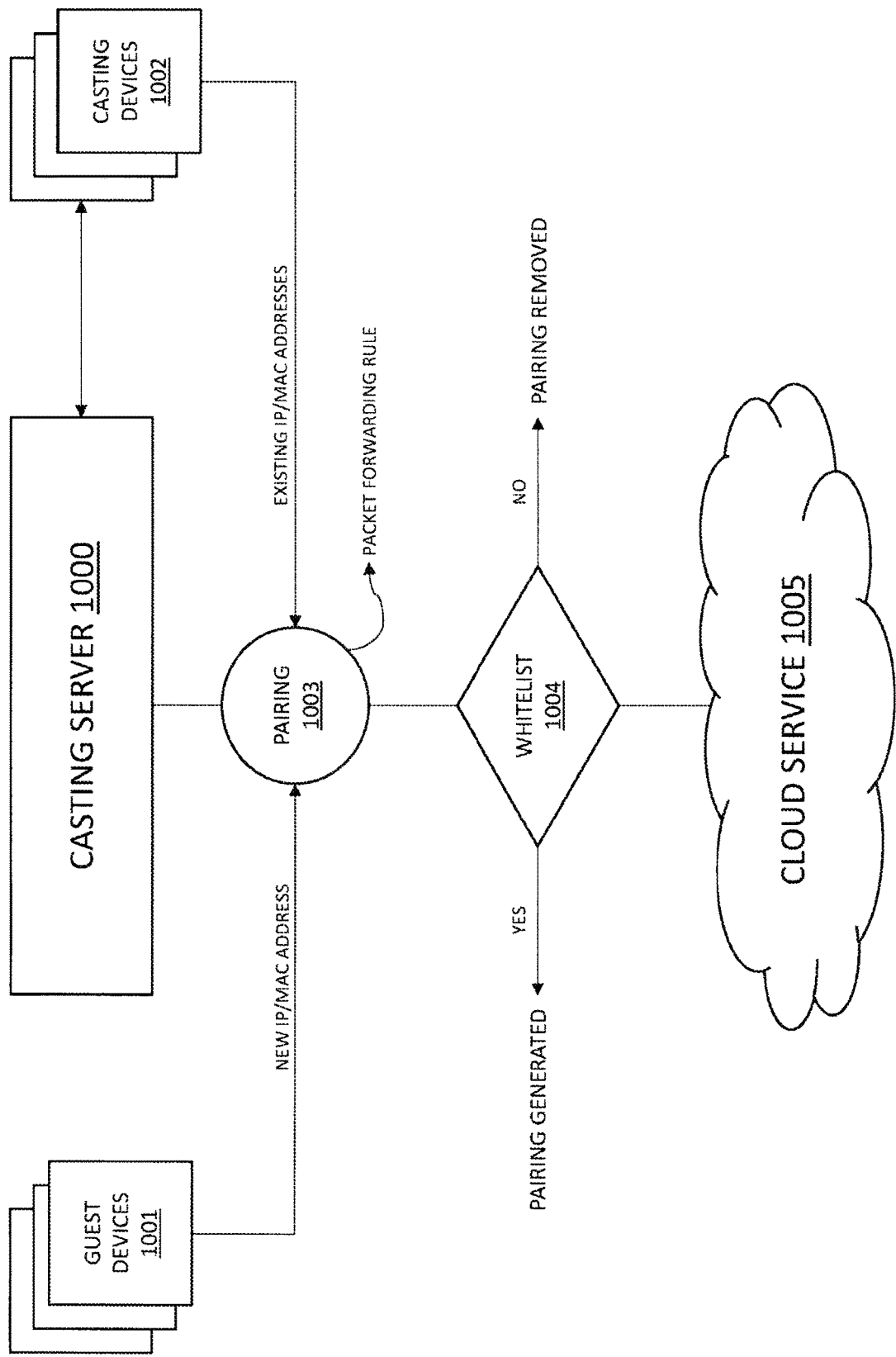
FIG. 10 illustrates how pairings may be created and removed in accordance with aspects of this disclosure.

FIG. 10 illustrates the pairing process of the casting system including the creation and removal of pairings. When the guest checks into her room and turns on the TV (if the TV is not already on), she may see a welcome screen with casting instructions. This may include a QR code that, upon activation, would cause the guest's guest device 1001 (e.g., smartphone) to contact the casting server 1000 via the guest network (or over the Internet). The casting server 1000 captures the guest's IP address and/or MAC address and creates and stores (e.g., in the cloud or local storage) a pairing between the guest device 1001 and one or more casting devices 1002 in the guest's room. Once the pairing 1003 has been created, the casting server 1000 may create one or more packet forwarding rules and allow mDNS discovery to occur for the guest device 1001. In some embodiments, in response to receiving a new pairing from the casting server 1000, the cloud service 1005 may check if the new pairing already exists in the current pairings, and if so, rejects the request to add a pairing. If the new pairing does not currently exist, the cloud service 1005 may instruct the casting server 1000 to create a packet forwarding rule for the pairing 1003 and enable mDNS discovery for the pairing 1003.

Larger hotels may have suites, which may have multiple casting devices 1002 and/or display devices. Once a pairing 1003 is created with one of such casting devices 1002, the casting server 1000 may determine that the guest device 1001 is also to be paired with other casting devices in the same room/unit/suite and create additional pairings accordingly. Multiple proxy IP addresses (e.g., proxy IP 302A) would allow guests to be able to distinguish between multiple casting devices 1002 they have access to in the their rooms and specify which casting device they wish to use.

When a pairing 1003 is to be removed, the casting server 1000 simply removes the packet forwarding rules. For example a table of rules, essentially a whitelist 1004 of packets, or sources and destination pairs that are allowed to pass, is maintained in a storage accessible by the casting server 1000. If a packet comes in, and there isn't a whitelist rule 1004 for it, the packet gets dropped. In order to remove a pairing, an administrator may send the casting server 1000 a message from the cloud service 1005 to remove this pairing 1003. And the casting server 1000 may delete the rules that allow forwarding between this guest device 1001 and that casting device 1002 the pairing 1003 was for. A pairing may be removed when the guest checks out, or according to a schedule (e.g., every day at 1 pm).

In some embodiments, when a guest wants to connect to the Wi-Fi network, the guest is directed to captive portal system on the guest network. When that captive portal system learns about the guest's location (e.g., room 105), the captive portal system may send that information to the casting server 1000, which can then automatically create a pairing to allow the guest devices 1001 to connect to the casting devices 1002 in the guest's room. In such a case, when the guest turns on the TV, instead of pairing instructions (e.g., along with a QR code), other content and/or an indication that the pairing has been created may be displayed.

Proxy ARP

Figure 11:
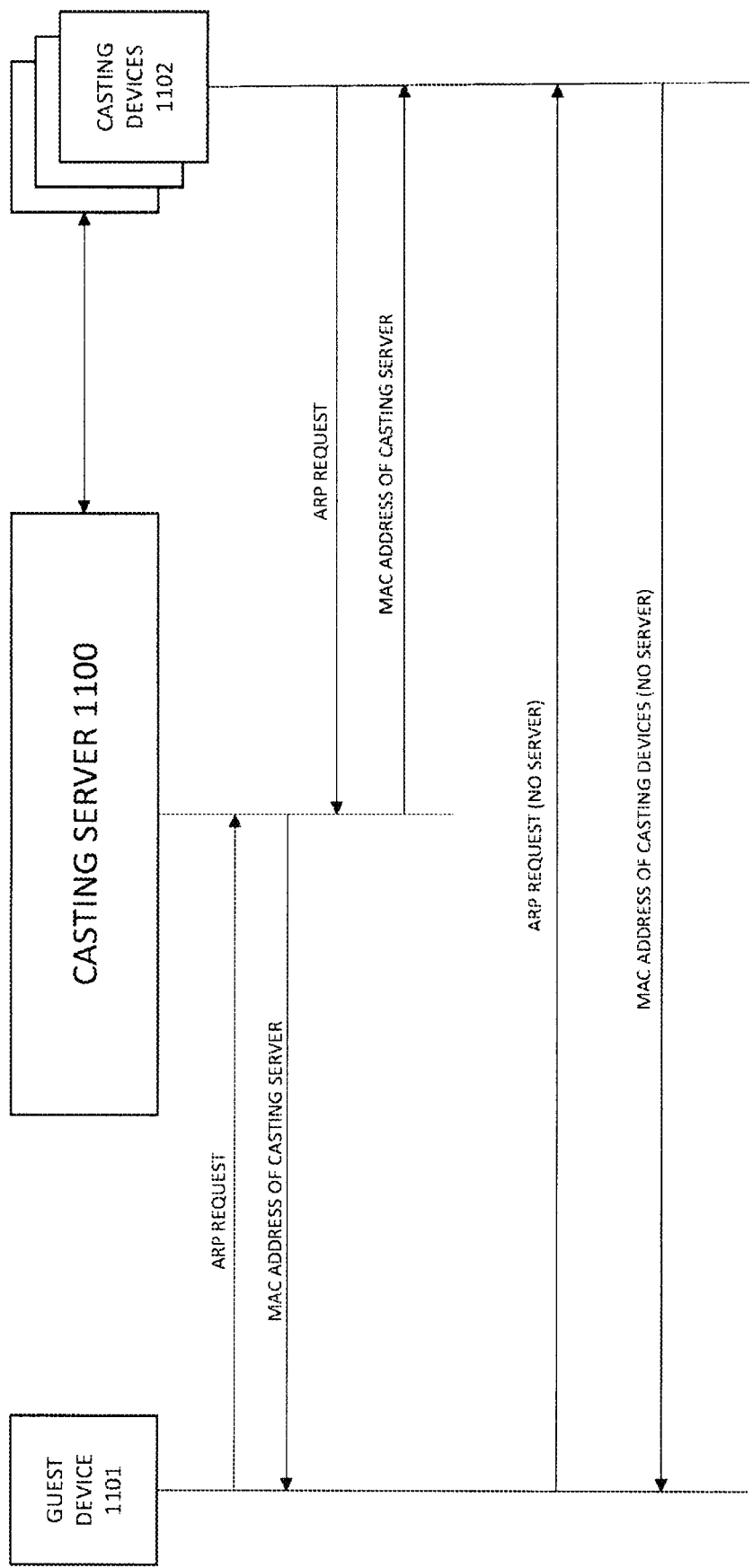
FIG. 11 illustrates a network environment including a proxy ARP configured to control user access in accordance with aspects of this disclosure.

FIG. 11 illustrates the workflow of proxy ARP, including embodiments with and without a casting server 1100. A guest device 1101 may send out an ARP request requesting the MAC address of the computer on the network that has a specific IP address, and normally, if the casting server 1100 did not exist, the casting device 1102 would respond directly and indicate that the casting device 1102 has that IP address, and provide its MAC address, and then the two computers would be able to communicate directly.

However, when the casting server is introduced, the casting server 1100 gets in the way, and the casting server 1100 may return its own MAC address. When a guest device 1101 requests the MAC address of the casting device 1102 that the guest device 1101 may communicate with, the guest device 1101 receives a response from the casting server 1000 including the MAC address of the casting server 1000 (instead of the MAC address of any casting device). Thus, all communications going to any device on the cast side of the network effectively get sent through the casting server 1000. The proxy ARP may cause any traffic that wants to reach the computers on the other side of the network (e.g., the casting devices) to be forced through the casting server (the proxy ARP may do the same for the traffic in the reverse direction). Here, when the casting device wants to communicate with a guest device, the casting device provides an ARP request, and gets told the MAC address of the cast side of the casting server, which forces any traffic that the casting device has for the guest side of the network to go through the casting server.

When a guest device 1101 sends a request to cast to a TV in the living room, and another request to cast to a TV in the bedroom, the two requests may have the same guest side MAC address, but two different IP addresses of the respective casting devices 1102 connected to the two TVs. In some embodiments, proxy IPs are used to communicate with different casting devices 1102. In other embodiments, actual IPs are used to communicate with different casting devices 1102 (with a proxy MAC). For example, the proxy IPs may be reused for each hotel room, and requests sent from two different guest devices 1101 in two different rooms to the same proxy IP address may be directed to two different casting devices 1102.

Communication Among Guest Device, Casting Device, and Casting Server

Figure 12:
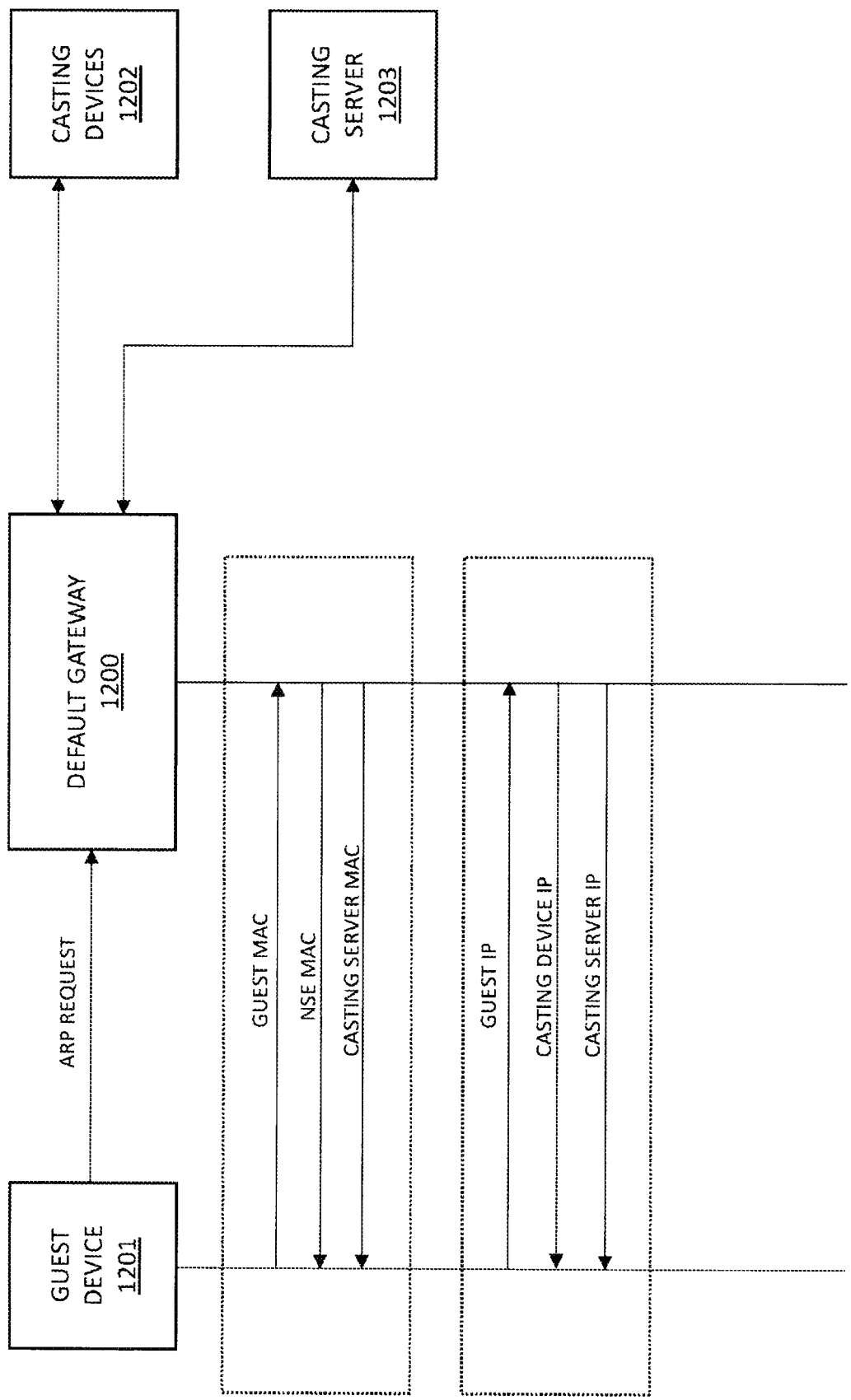
FIG. 12 illustrates a network environment including a default gateway configured to perform client isolation in accordance with aspects of this disclosure.

FIG. 12 illustrates a network environment including a default gateway for performing client isolation in accordance with aspects of this disclosure. This figure shows the workflow of the interaction between a guest device 1201 and its corresponding default gateway 1200. In TCP, the guest device would believe it is opening a connection to the IP addresses of the casting devices 1202, which are being represented (or proxied) by the NSE. Further assuming that an available ethernet port on the NSE has been configured as a casting bridge, when traffic to a casting IP address is received by the NSE on a subscriber VLAN, the NSE may re-transmit the packets on the casting ethernet port (e.g., default gateway reads the destination MAC address and forwards the MAC address directly to the specific port the MAC address is plugged into, e.g., the ethernet port to which the casting server is connected).

In this embodiment, the guest device 1201 may send an ARP request for the IP addresses of the casting devices 1202. Here the default gateway 1200 may respond to the ARP request by providing its own MAC (e.g., NSE MAC below) in the reply packets. When the guest device 1201 provides its MAC address on the ARP request, the default gateway may reply with its own NSE MAC address in the reply packets sent to the guest device 1201. The default gateway may also reply with the MAC address of the casting server 1203 in the reply packets, assuming that the casting server 1203 may accept packets for the casting IPs.

The default gateway 1200 may also provide the IP addresses of the casting devices 1202 in the reply packets. If the guest device 1201 provides its IP address on the ARP request, the default gateway may reply with the IP addresses of the casting devices 1202 in the reply packets sent to the guest device 1201. The default gateway may also reply with the IP address of the casting server 1203 in the reply packets, assuming that the casting server 1203 may accept packets for the casting Ips.

Upon re-transmission, the SRC MAC can be preserved to be that of the guest device. By doing so, the guest device 1201 can be tracked by MAC address. It is possible to track by IP instead, but IP addresses can change much more frequently than MAC addresses, so it can be more reliable to track guest devices by MAC.

Enumerated Implementations (EIs)

Some examples of enumerated implementations (EIs) are provided in this section, without limitation.

EI 1: A casting system comprising: a display device; a casting device configured to access content and cause the accessed content to be cast onto the display device; and a casting server comprising computer hardware, wherein the casting server is in network communication with the casting device over a cast network, and the casting server is in network communication with a guest device over a guest network separate from the cast network, wherein the casting server is configured to: receive location information associated with the guest device and a MAC address associated with the guest device; determine, based on the location information, that the guest device is in the same location as the casting device; generate, using the MAC address of the guest device, a pairing between the guest device and the casting device; transmit the pairing to a cloud service configured to manage and monitor a plurality of pairings on behalf of the casting device; receive an indication from the cloud service that the cloud service has successfully stored the pairing; generate a packet forwarding rule usable by the casting server to transmit one or more network packets from the guest device to the casting device and/or from the casting device to the guest device; cause the packet forwarding rule to be stored for subsequent access by the casting server; receive a discovery request from the guest device to discover a casting device usable by the guest device; forward, based on the packet forwarding rule and with or without communicating with the casting device, a discovery response back to the guest device including a proxy IP address usable by the guest device to communicate with the casting device; receive a casting request from the guest device, wherein the casting request indicates the proxy IP address; and transmit, to the casting device, information usable by the casting device to download a requested content from the Internet and to cast the requested content onto the display device in communication with the casting device.

EI 2: The system of EI 1, wherein the casting device is configured to download the requested content without passing network traffic through the casting server such that the downloading of the requested content does not place any additional network load on the casting server.

EI 3: The system of EI 1, wherein upon receiving a multicast DNS packet from the guest device, the casting server is configured to fake a response from the casting device without forwarding the multicast DNS packet to the casting device.

EI 4: The system of EI 3, wherein the casting server is further configured to output a captive portal to the guest device.

EI 5: The system of EI 1, wherein the casting server is configured to respond to multicast DNS requests from guest devices by returning different proxy IP addresses to represent different casting devices.

EI 6: The system of EI 1, wherein the casting server is configured to remove the pairing in response to a request to remove the pairing received from the cloud service.

EI 7: The system of EI 6, wherein the packet forwarding rule is stored in random access memory (RAM), and in response to the pairing being removed, the packet forwarding rule is deleted from the RAM.

EI 8: The system of EI 1, wherein proxy ARP is configured to force packets from the guest device or the casting device to pass through the casting server instead of a default gateway of a local network associated with the guest device or the casting device.

EI 9: The system of EI 1, wherein the casting server is further configured to receive, from the guest device, an ARP request associated with an IP address, and respond by returning the MAC address associated with the casting server.

EI 10: A method of casting, comprising: receiving location information associated with a guest device and a MAC address associated with the guest device; determining, based on the location information, that the guest device is in the same location as a casting device; generating, using the MAC address of the guest device, a pairing between the guest device and the casting device; transmitting the pairing to a cloud service configured to manage and monitor a plurality of pairings on behalf of the casting device; receiving an indication from the cloud service that the cloud service has successfully stored the pairing; generating a packet forwarding rule usable by a casting server to transmit one or more network packets from the guest device to the casting device and/or from the casting device to the guest device; causing the packet forwarding rule to be stored for subsequent access by the casting server; receiving a discovery request from the guest device to discover a casting device usable by the guest device; forwarding, based on the packet forwarding rule and with or without communicating with the casting device, a discovery response back to the guest device including a proxy IP address usable by the guest device to communicate with the casting device; receiving a casting request from the guest device, wherein the casting request indicates the proxy IP address; and transmitting, to the casting device, information usable by the casting device to download a requested content from the Internet and to cast the requested content onto a display device in communication with the casting device.

EI 11: The method of EI 10, further comprising downloading the requested content without passing network traffic through the casting server such that the downloading of the requested content does not place any additional network load on the casting server.

EI 12: The method of EI 10, further comprising, upon receiving a multicast DNS packet from the guest device, faking a response from the casting device without forwarding the multicast DNS packet to the casting device.

EI 13: The method of EI 10, further comprising responding to multicast DNS requests from guest devices by returning different proxy IP addresses to represent different casting devices.

EI 14: The method of EI 10, further comprising removing the pairing in response to a request to remove the pairing received from the cloud service.

EI 15: The method of EI 10, further comprising forcing packets from the guest device or the casting device to pass through a casting server instead of a default gateway of a local network associated with the guest device or the casting device.

EI 16: The method of EI 10, further comprising receiving, from the guest device, an ARP request associated with an IP address, and responding by returning the MAC address associated with a casting server.

EI 17: A non-transitory computer storage medium storing computer-executable instructions that, when executed by one or more computing devices, cause the one or more computing devices to execute operations comprising: receiving location information associated with a guest device and a MAC address associated with the guest device; determining, based on the location information, that the guest device is in the same location as a casting device; generating, using the MAC address of the guest device, a pairing between the guest device and the casting device; transmitting the pairing to a cloud service configured to manage and monitor a plurality of pairings on behalf of the casting device; receiving an indication from the cloud service that the cloud service has successfully stored the pairing; generating a packet forwarding rule usable by a casting server to transmit one or more network packets from the guest device to the casting device and/or from the casting device to the guest device; causing the packet forwarding rule to be stored for subsequent access by the casting server; receiving a discovery request from the guest device to discover a casting device usable by the guest device; forwarding, based on the packet forwarding rule and with or without communicating with the casting device, a discovery response back to the guest device including a proxy IP address usable by the guest device to communicate with the casting device; receiving a casting request from the guest device, wherein the casting request indicates the proxy IP address; and transmitting, to the casting device, information usable by the casting device to download a requested content from the Internet and to cast the requested content onto a display device in communication with the casting device.

EI 18: The non-transitory computer storage medium of EI 17, wherein the operations further comprise downloading the requested content without passing network traffic through the casting server such that the downloading of the requested content does not place any additional network load on the casting server.

EI 19: The non-transitory computer storage medium of EI 17, wherein the operations further comprise, upon receiving a multicast DNS packet from the guest device, faking a response from the casting device without forwarding the multicast DNS packet to the casting device.

EI 20: The non-transitory computer storage medium of EI 17, wherein the operations further comprise responding to multicast DNS requests from guest devices by returning different proxy IP addresses to represent different casting devices.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The term "set" is used to include "one or more." For example, a set of objects may include a single object or multiple objects.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the scope of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A system comprising:
   a display device;

a casting device configured to access content and cause the accessed content to be cast onto the display device; and a casting server comprising computer hardware, wherein the casting server is in network communication with the casting device over a cast network, and the casting server is in network communication with a guest device over a guest network separate from the cast network, wherein the casting server is configured to:

receive location information associated with the guest device and a MAC address associated with the guest device;

determine, based on the location information, that the guest device is in the same location as the casting device;

generate, using the MAC address of the guest device, a pairing between the guest device and the casting device;

transmit the pairing to a cloud service configured to manage and monitor a plurality of pairings on behalf of the casting device;

receive an indication from the cloud service that the cloud service has successfully stored the pairing;

generate a packet forwarding rule usable by the casting server to transmit one or more network packets from the guest device to the casting device and/or from the casting device to the guest device;

cause the packet forwarding rule to be stored for subsequent access by the casting server;

receive a discovery request from the guest device to discover a casting device usable by the guest device;

forward, based on the packet forwarding rule and with or without communicating with the casting device, a discovery response back to the guest device including a proxy IP address usable by the guest device to communicate with the casting device;

receive a casting request from the guest device, wherein the casting request indicates the proxy IP address; and transmit, to the casting device, information usable by the casting device to download a requested content from the Internet and to cast the requested content onto the display device in communication with the casting device.

2. The system of claim 1, wherein the casting device is configured to download the requested content without passing network traffic through the casting server such that the downloading of the requested content does not place any additional network load on the casting server.

3. The system of claim 1, wherein upon receiving a multicast DNS packet from the guest device, the casting server is configured to fake a response from the casting device without forwarding the multicast DNS packet to the casting device.

4. The system of claim 3, wherein the casting server is further configured to output a captive portal to the guest device.

5. The system of claim 1, wherein the casting server is configured to respond to multicast DNS requests from guest devices by returning different proxy IP addresses to represent different casting devices.

6. The system of claim 1, wherein the casting server is configured to remove the pairing in response to a request to remove the pairing received from the cloud service.

7. The system of claim 6, wherein the packet forwarding rule is stored in random access memory (RAM), and in response to the pairing being removed, the packet forwarding rule is deleted from the RAM.

8. The system of claim 1, wherein proxy ARP is configured to force packets from the guest device or the casting device to pass through the casting server instead of a default gateway of a local network associated with the guest device or the casting device.

9. The system of claim 1, wherein the casting server is further configured to receive, from the guest device, an ARP request associated with an IP address, and respond by returning the MAC address associated with the casting server.

10. A method of casting, comprising:

receiving location information associated with a guest device and a MAC address associated with the guest device;

determining, based on the location information, that the guest device is in the same location as a casting device;

generating, using the MAC address of the guest device, a pairing between the guest device and the casting device;

transmitting the pairing to a cloud service configured to manage and monitor a plurality of pairings on behalf of the casting device;

receiving an indication from the cloud service that the cloud service has successfully stored the pairing;

generating a packet forwarding rule usable by a casting server to transmit one or more network packets from the guest device to the casting device and/or from the casting device to the guest device;

causing the packet forwarding rule to be stored for subsequent access by the casting server;

receiving a discovery request from the guest device to discover a casting device usable by the guest device;

forwarding, based on the packet forwarding rule and with or without communicating with the casting device, a discovery response back to the guest device including a proxy IP address usable by the guest device to communicate with the casting device;

receiving a casting request from the guest device, wherein the casting request indicates the proxy IP address; and transmitting, to the casting device, information usable by the casting device to download a requested content from the Internet and to cast the requested content onto a display device in communication with the casting device.

11. The method of claim 10, further comprising downloading the requested content without passing network traffic through the casting server such that the downloading of the requested content does not place any additional network load on the casting server.

12. The method of claim 10, further comprising, upon receiving a multicast DNS packet from the guest device, faking a response from the casting device without forwarding the multicast DNS packet to the casting device.

13. The method of claim 10, further comprising responding to multicast DNS requests from guest devices by returning different proxy IP addresses to represent different casting devices.

14. The method of claim 10, further comprising removing the pairing in response to a request to remove the pairing received from the cloud service.

15. The method of claim 10, further comprising forcing packets from the guest device or the casting device to pass through a casting server instead of a default gateway of a local network associated with the guest device or the casting device.

16. The method of claim 10, further comprising receiving, from the guest device, an ARP request associated with an IP address, and responding by returning the MAC address associated with a casting server.

17. A non-transitory computer storage medium storing computer-executable instructions that, when executed by one or more computing devices, cause the one or more computing devices to execute operations comprising:
- receiving location information associated with a guest device and a MAC address associated with the guest device;
- determining, based on the location information, that the guest device is in the same location as a casting device;
- generating, using the MAC address of the guest device, a pairing between the guest device and the casting device;
- transmitting the pairing to a cloud service configured to manage and monitor a plurality of pairings on behalf of the casting device;
- receiving an indication from the cloud service that the cloud service has successfully stored the pairing;
- generating a packet forwarding rule usable by a casting server to transmit one or more network packets from the guest device to the casting device and/or from the casting device to the guest device;
- causing the packet forwarding rule to be stored for subsequent access by the casting server;
- receiving a discovery request from the guest device to discover a casting device usable by the guest device;
- forwarding, based on the packet forwarding rule and with or without communicating with the casting device, a discovery response back to the guest device including a proxy IP address usable by the guest device to communicate with the casting device;
- receiving a casting request from the guest device, wherein the casting request indicates the proxy IP address; and
- transmitting, to the casting device, information usable by the casting device to download a requested content from the Internet and to cast the requested content onto a display device in communication with the casting device.

18. The non-transitory computer storage medium of claim 17, wherein the operations further comprise downloading the requested content without passing network traffic through the casting server such that the downloading of the requested content does not place any additional network load on the casting server.

19. The non-transitory computer storage medium of claim 17, wherein the operations further comprise, upon receiving a multicast DNS packet from the guest device, faking a response from the casting device without forwarding the multicast DNS packet to the casting device.

20. The non-transitory computer storage medium of claim 17, wherein the operations further comprise responding to multicast DNS requests from guest devices by returning different proxy IP addresses to represent different casting devices.

* * * * *